(12) United States Patent
Terashima

(10) Patent No.: US 7,860,386 B2
(45) Date of Patent: Dec. 28, 2010

(54) IMAGING APPARATUS, CONTROL METHOD OF IMAGING APPARATUS, AND COMPUTER PROGRAM

(75) Inventor: Yoshito Terashima, Tokyo (JP)

(73) Assignee: Sony Corporation, Tokyo (JP)

( * ) Notice: Subject to any disclaimer, the term of this patent is extended or adjusted under 35 U.S.C. 154(b) by 735 days.

(21) Appl. No.: 11/760,481

(22) Filed: Jun. 8, 2007

(65) Prior Publication Data

US 2007/0286590 A1 Dec. 13, 2007

(30) Foreign Application Priority Data

Jun. 9, 2006 (JP) ............... 2006-160451

(51) Int. Cl.
G03B 3/00 (2006.01)
G03B 13/00 (2006.01)

(52) U.S. Cl. ................... 396/104; 348/349

(58) Field of Classification Search ........... 396/78, 396/103, 121, 123, 125, 104; 348/345, 349
See application file for complete search history.

(56) References Cited

U.S. PATENT DOCUMENTS

| 2003/0025805 | A1* | 2/2003 | Yamagishi | 348/222.1 |
| 2004/0208114 | A1* | 10/2004 | Lao et al. | 369/125 |
| 2005/0270410 | A1 | 12/2005 | Takayama | |
| 2006/0274960 | A1* | 12/2006 | Tamaru | 382/274 |
| 2007/0030381 | A1* | 2/2007 | Maeda | 348/345 |
| 2007/0285528 | A1* | 12/2007 | Mise et al. | 348/222.1 |

FOREIGN PATENT DOCUMENTS

| CN | 1716078 A | 1/2006 |
| JP | 60-254207 | 12/1985 |
| JP | 4-421 | 1/1992 |
| JP | 10-213737 | 8/1998 |
| JP | 2002-333652 | 11/2002 |
| JP | 2003-035863 | 2/2003 |
| JP | 2003-075717 | 3/2003 |
| JP | 2003-75717 | 3/2003 |

(Continued)

OTHER PUBLICATIONS

U.S. Appl. No. 11/760,436, filed Jun. 8, 2007, Ishiwata, et al.

(Continued)

*Primary Examiner*—W. B. Perkey
*Assistant Examiner*—Minh Q Phan
(74) *Attorney, Agent, or Firm*—Oblon, Spivak, McClelland, Maier & Neustadt, L.L.P.

(57) ABSTRACT

An imaging apparatus includes: a face detecting part configured to detect a face area from the input image inputted from an imaging apparatus; a subject distance computing part configured to compute a subject distance based on the size of a face detected in the face detecting part; a lens operating range computing part configured to estimate a focus position based on information about the subject distance computed in the subject distance computing part, and to set a focus lens operating range shorter than an entire operating range of a focus lens; and a focus control part configured to move the focus lens within the lens operating range set in the lens operating range computing part, and to decide a position at which the focus lens is set.

25 Claims, 18 Drawing Sheets

FOREIGN PATENT DOCUMENTS

| | | |
|---|---|---|
| JP | 2003-107335 | 4/2003 |
| JP | 2004-133637 | 4/2004 |
| JP | 2004-222118 | 8/2004 |
| JP | 2004-317699 | 11/2004 |
| JP | 2004-320287 | 11/2004 |
| JP | 2005-086682 | 3/2005 |
| JP | 2005-128156 | 5/2005 |
| JP | 2006-018246 | 1/2006 |
| JP | 2006-145629 | 6/2006 |
| JP | 2006-201282 | 8/2006 |
| JP | 2007-178543 | 7/2007 |

OTHER PUBLICATIONS

U.S. Appl. No. 11/756,207, filed May 31, 2007, Mise, et al.
U.S. Appl. No. 11/773,247, filed Jul. 3, 2007, Ishiwata, et al.

* cited by examiner

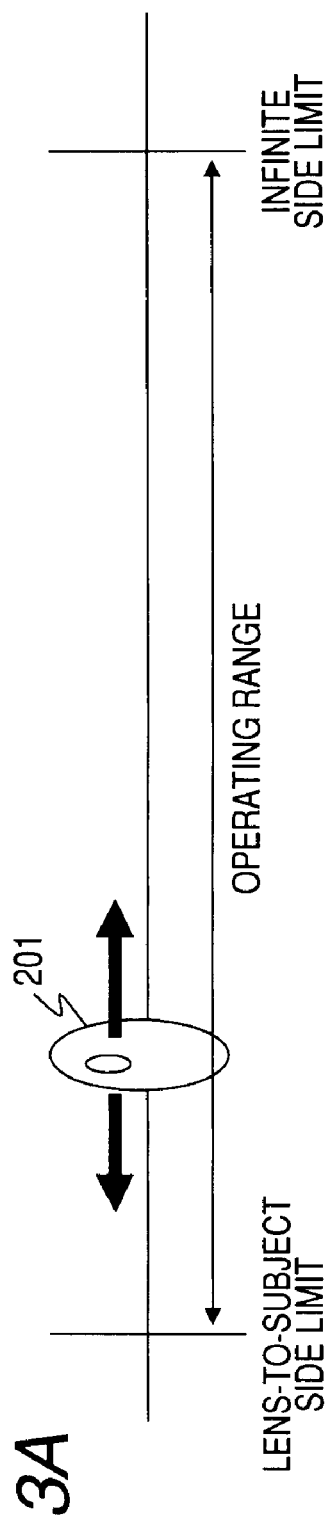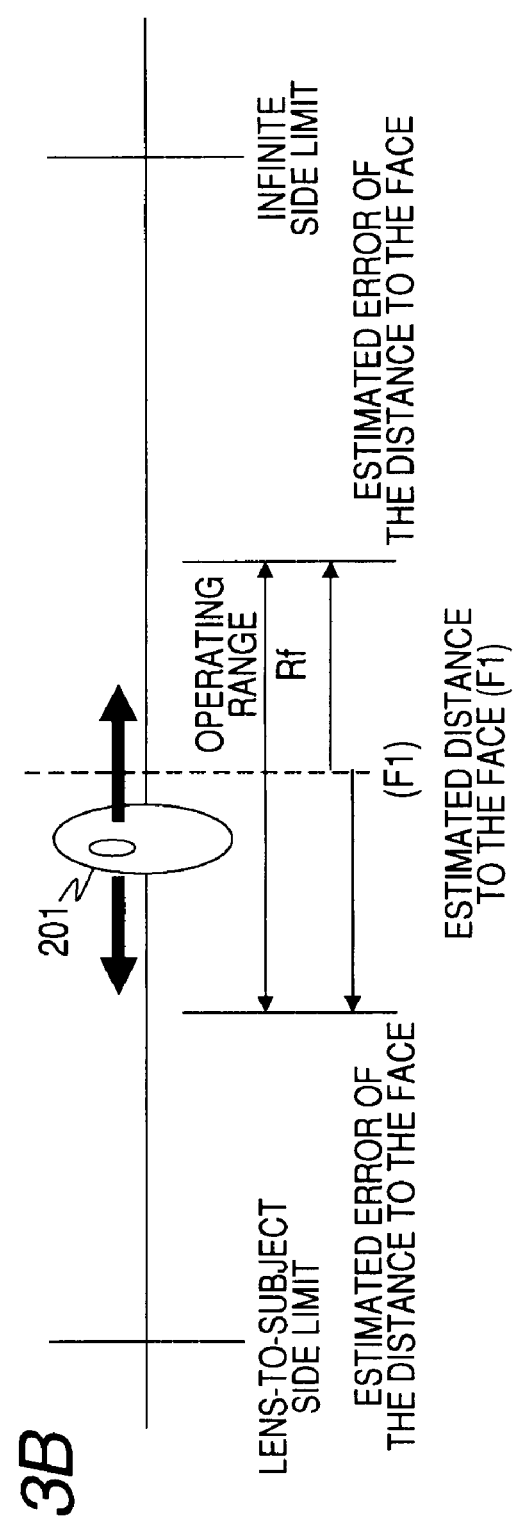

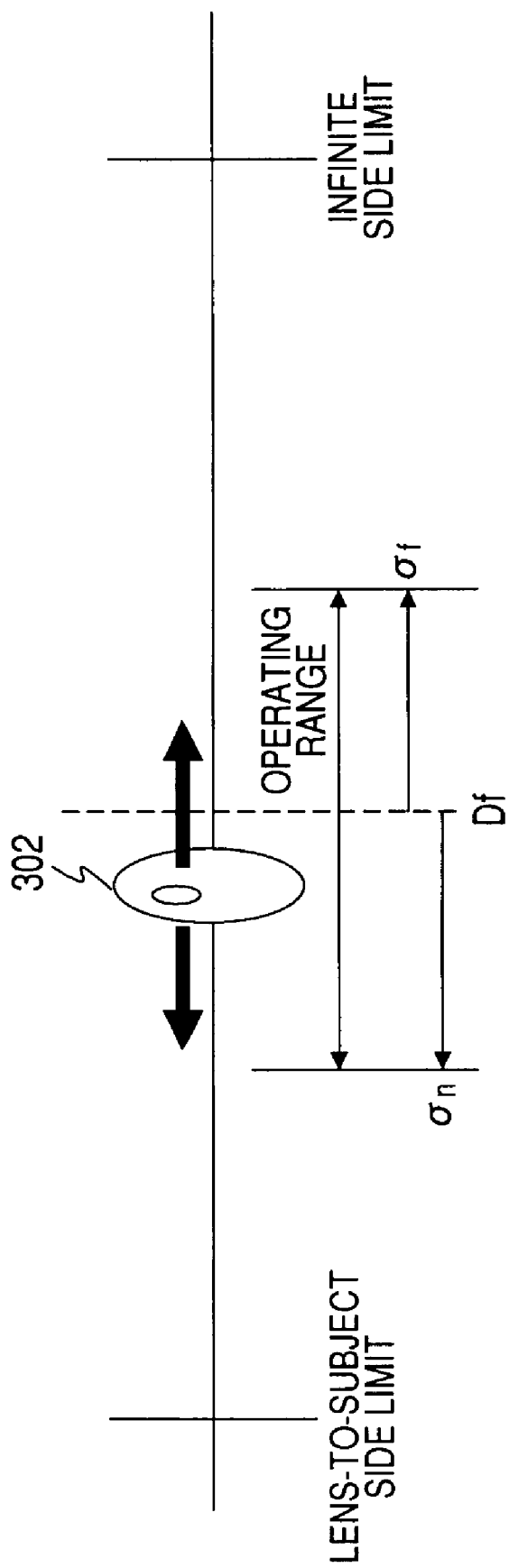

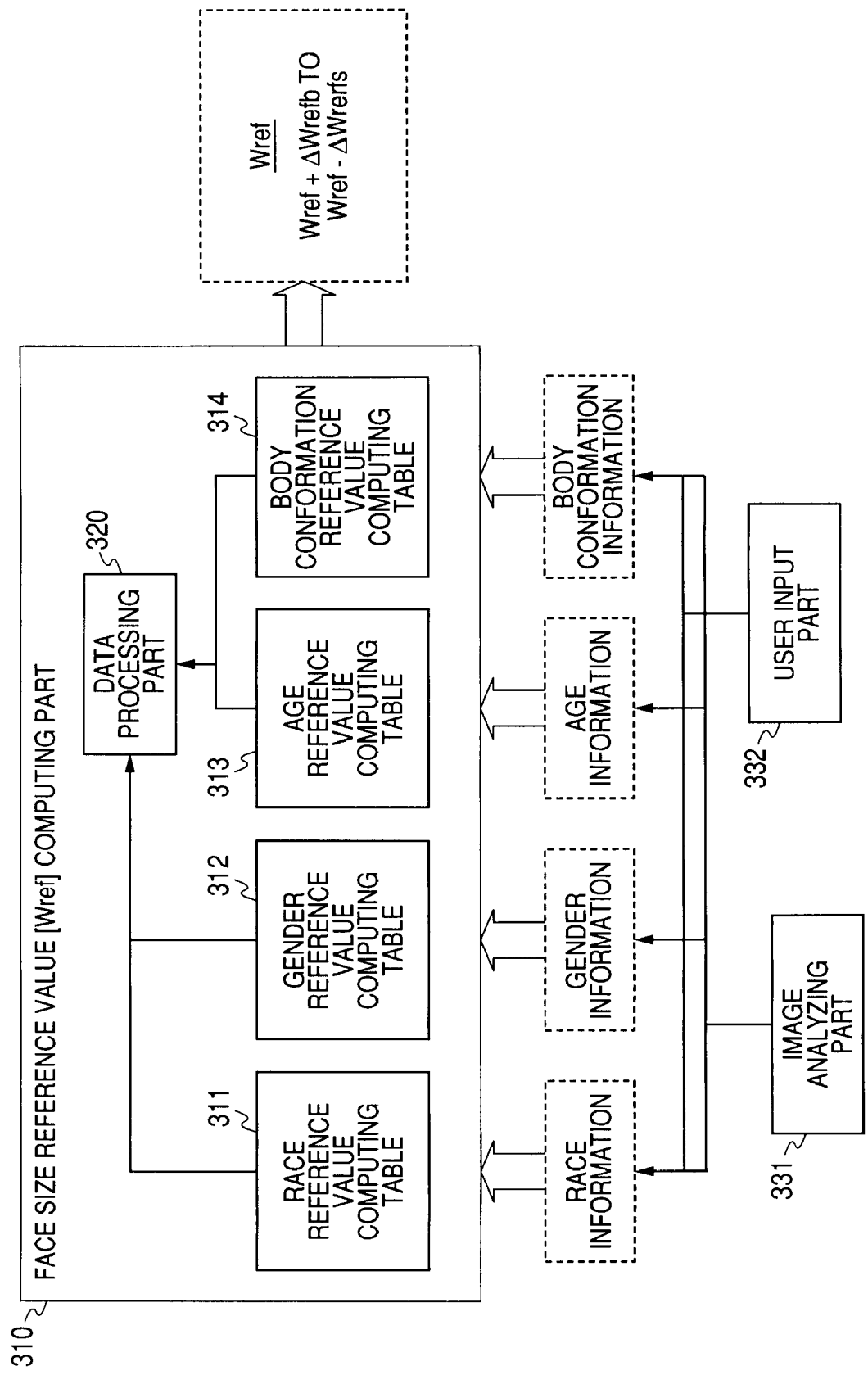

FIG. 8A

RACE REFERENCE VALUE COMPUTING TABLE

| | BREADTH | | VERTICAL LENGTH | |
|---|---|---|---|---|
| | MINIMUM | MAXIMUM | MINIMUM | MAXIMUM |
| COMMON | 8 | 20 | 8 | 28 |
| ASIAN RACE | 8 | 18 | 9 | 26 |
| CAUCASOID RACE | 8 | 20 | 9 | 28 |
| AFRICAN RACE | 8 | 17 | 8 | 25 |

FIG. 8B

RACE AND GENDER REFERENCE VALUE COMPUTING TABLE

| | GENDER | BREADTH | | VERTICAL LENGTH | |
|---|---|---|---|---|---|
| | | MINIMUM | MAXIMUM | MINIMUM | MAXIMUM |
| COMMON | COMMON | 8 | 20 | 8 | 28 |
| | MALE | 8 | 20 | 9 | 28 |
| | FEMALE | 8 | 17 | 8 | 26 | ← ROW B
| ASIAN RACE | COMMON | 8 | 18 | 9 | 26 |
| | MALE | 8 | 18 | 9 | 26 | ← ROW A
| | FEMALE | 8 | 16 | 9 | 24 |
| CAUCASOID RACE | COMMON | 8 | 20 | 9 | 28 |
| | MALE | 8 | 20 | 9 | 28 |
| | FEMALE | 8 | 17 | 9 | 26 |
| AFRICAN RACE | COMMON | 8 | 20 | 9 | 28 |
| | MALE | 8 | 20 | 9 | 28 |
| | FEMALE | 8 | 17 | 8 | 26 |

FIG. 9

RACE, GENDER AND AGE REFERENCE VALUE COMPUTING TABLE

| | | | BREADTH | | VERTICAL LENGTH | |
|---|---|---|---|---|---|---|
| | | AGE | MINIMUM | MAXIMUM | MINIMUM | MAXIMUM |
| | COMMON | COMMON | 8 | 18 | 9 | 26 |
| | | UP TO 3 | 8 | 12 | 9 | 15 |
| | | 3 TO 12 | 12 | 14 | 14 | 22 |
| | | 12 TO | 12 | 18 | 20 | 26 |
| ASIAN RACE | MALE | COMMON | 8 | 18 | 9 | 26 ← ROW D |
| | | UP TO 3 | 8 | 12 | 9 | 15 |
| | | 3 TO 12 | 12 | 14 | 15 | 22 |
| | | 12 TO | 13 | 18 | 22 | 26 ← ROW C |
| | FEMALE | COMMON | 8 | 16 | 9 | 24 |
| | | UP TO 3 | 8 | 12 | 9 | 14 |
| | | 3 TO 12 | 11 | 14 | 14 | 20 |
| | | 12 TO | 12 | 17 | 19 | 24 |

FIG. 10

RACE, GENDER, AGE AND BODY CONFORMATION REFERENCE VALUE COMPUTING TABLE

| | | | BODY CONFORMATION | BREADTH | | VERTICAL LENGTH | |
|---|---|---|---|---|---|---|---|
| | | | | MINIMUM | MAXIMUM | MINIMUM | MAXIMUM |
| ASIAN RACE | COMMON | COMMON | COMMON | 8 | 18 | 9 | 26 |
| | | | REGULAR | 8 | 17 | 9 | 24 |
| | | | TALL | 8 | 18 | 9 | 26 |
| | | UP TO 3 | COMMON | 8 | 12 | 9 | 15 |
| | | | REGULAR | 8 | 12 | 9 | 15 |
| | | | TALL | 8 | 12 | 9 | 15 |
| | | 3 TO 12 | COMMON | 11 | 14 | 14 | 22 |
| | | | REGULAR | 11 | 13 | 13 | 20 |
| | | | TALL | 12 | 14 | 14 | 22 |
| | | 12 TO | COMMON | 12 | 18 | 19 | 26 |
| | | | REGULAR | 12 | 16 | 19 | 24 |
| | | | TALL | 13 | 18 | 20 | 26 |
| | MALE | COMMON | COMMON | 8 | 18 | 9 | 26 |
| | | | REGULAR | 8 | 17 | 9 | 24 |
| | | | TALL | 8 | 18 | 9 | 26 |
| | | UP TO 3 | COMMON | 8 | 12 | 9 | 15 |
| | | | REGULAR | 8 | 12 | 9 | 15 |
| | | | TALL | 8 | 12 | 9 | 15 |
| | | 3 TO 12 | COMMON | 12 | 14 | 15 | 22 |
| | | | REGULAR | 12 | 13 | 15 | 20 |
| | | | TALL | 12 | 14 | 15 | 22 |
| | | 12 TO | COMMON | 13 | 18 | 22 | 26 |
| | | | REGULAR | 13 | 16 | 22 | 24 |
| | | | TALL | 14 | 18 | 23 | 26 |
| | FEMALE | COMMON | COMMON | 8 | 16 | 9 | 24 |
| | | | REGULAR | 8 | 15 | 9 | 23 |
| | | | TALL | 8 | 16 | 9 | 24 |
| | | UP TO 3 | COMMON | 8 | 12 | 9 | 14 |
| | | | REGULAR | 8 | 12 | 9 | 14 |
| | | | TALL | 8 | 12 | 9 | 14 |
| | | 3 TO 12 | COMMON | 11 | 14 | 14 | 20 |
| | | | REGULAR | 11 | 13 | 13 | 19 |
| | | | TALL | 12 | 14 | 14 | 20 |
| | | 12 TO | COMMON | 12 | 17 | 19 | 24 |
| | | | REGULAR | 12 | 15 | 19 | 23 |
| | | | TALL | 13 | 17 | 20 | 24 |

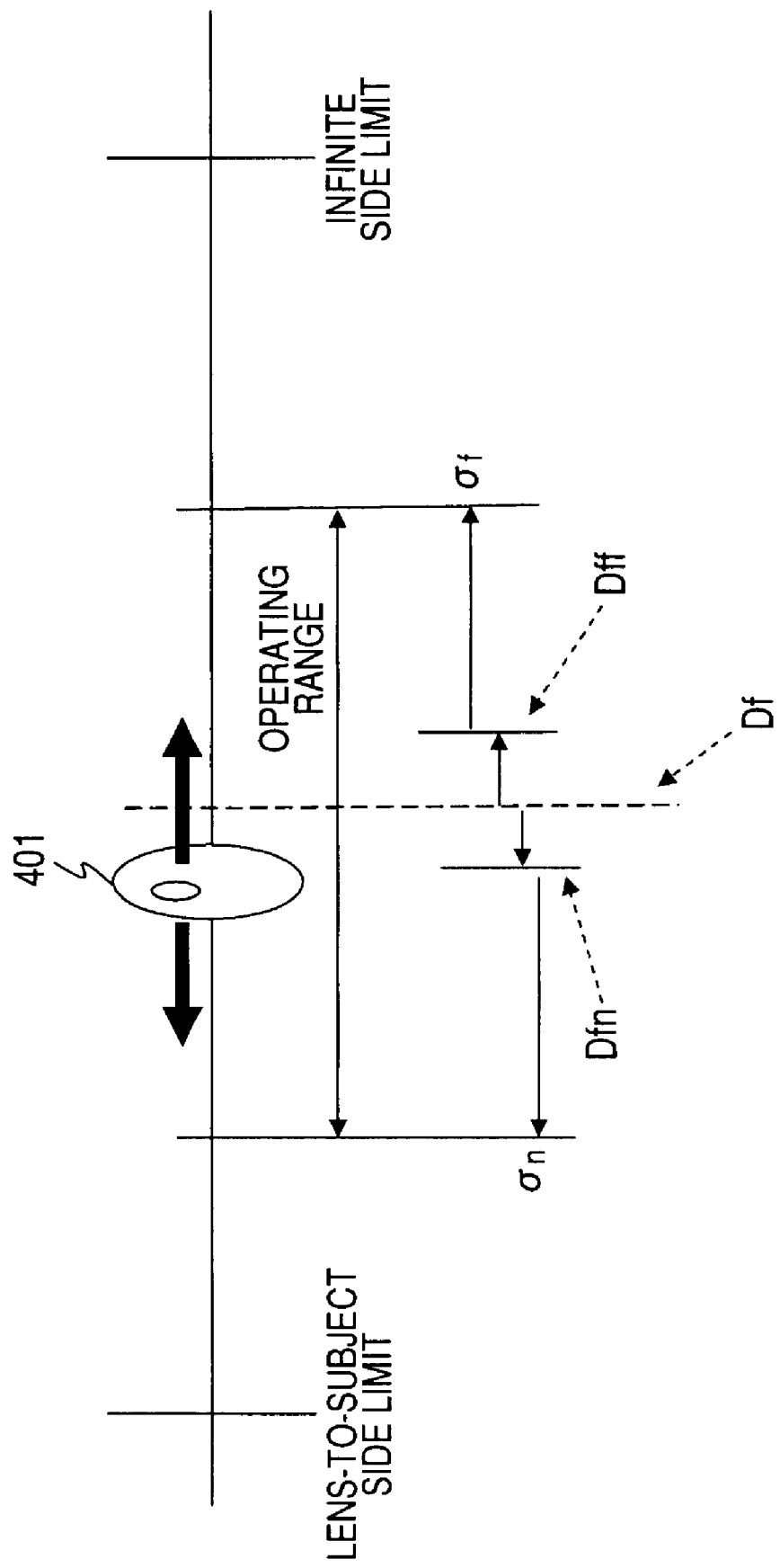

FIG. 15
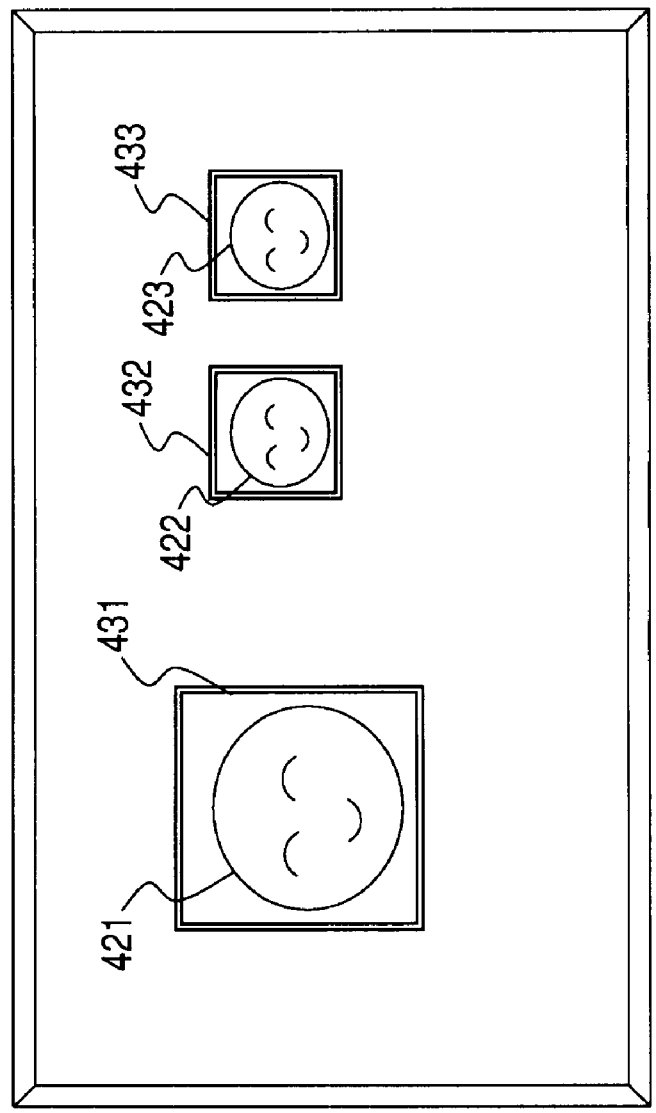
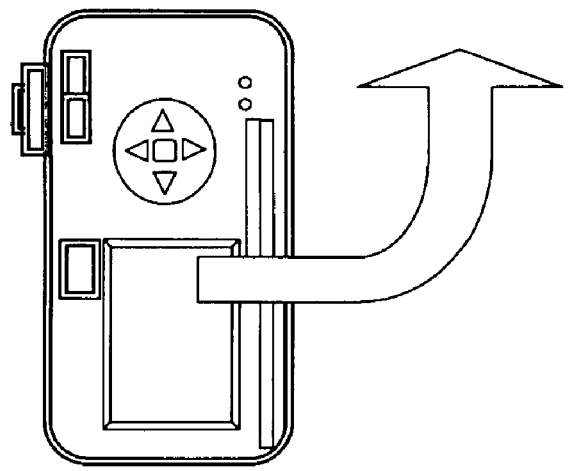

US 7,860,386 B2

IMAGING APPARATUS, CONTROL METHOD OF IMAGING APPARATUS, AND COMPUTER PROGRAM

CROSS REFERENCES TO RELATED APPLICATIONS

The present invention contains subject matter related to Japanese Patent Application JP 2006-160451 filed in the Japanese Patent Office on Jun. 9, 2006, the entire contents of which being incorporated herein by reference.

BACKGROUND OF THE INVENTION

1. Field of the Invention

The present invention relates to an imaging apparatus, a control method of an imaging apparatus, and a computer program. More specifically, the invention relates to an imaging apparatus, a control method of an imaging apparatus, and a computer program, which allow a quick, accurate Auto focusing process for a target subject.

2. Description of the Related Art

Many imaging apparatus nowadays such as a still camera and a video camera have an auto focusing (AF) mechanism mounted thereon which automatically bring a subject into focus. In addition, in recent years, in a camera having an auto focusing (AF) function, such a function, a so-called "Multi AF", or "multipoint range AF", is widely adopted, which measures a distance to a plurality of areas in a screen, selects the optimum area resulting from various priorities such as one being closest to a photographer, and one being closer to the center of the screen, and drives a lens to bring the area into focus. This function is applied to allow proper focusing for a main subject with no special operations done by a photographer even though the main subject is not always on the center of the screen. Moreover, for the configuration of auto focusing control, for example, it is described in Patent Reference 1 (see JP-A-4-000421).

However, such the Multi AF or multipoint range AF function does not serve for all purposes, and these functions are effective only for a specific composition. In general camera shooting, people are a main subject in a great many cases, but people are at many places in a taken image, and there are various compositions. In the first place, in some cases, a target subject is at the position at which the area to measure a distance is not set in an imaging apparatus. In this case, even though the Multi AF or multipoint range AF function is applied, people are not brought into focus properly.

In order to solve such problems, such a configuration is proposed in which a face is recognized from an image in an imaging apparatus, and the area to measure a distance is set at the position of the recognized face that, whereby the face can be brought into focus in any compositions. For example, Patent Reference 2 discloses a configuration of focus control based on such face recognition (see JP-A-2003-107335). By the focus control based on this face recognition, proper focus control (focusing) is allowed in shooting various compositions.

However, in order not to lose a chance to take a picture, time consuming processing is not suited. In other words, the AF function that merely brings the face into focus in the area to measure a distance is not enough, and it is necessary to contrive a scheme for accelerating the AF function. For the configuration which proposes focus control processing in the point of view that focus control is done quickly and a chance to take a picture is not lost, for example, there is Patent Reference 3 (see JP-A-60-254207). In Patent Reference 3, an apparatus is proposed in which a particular subject is recognized to measure a distance while the subject is being kept track, and focus control is quickly performed to allow shooting that will not lose a chance to take a picture.

However, in such an AF function which keeps track of a main subject, a problem is: what is a main subject for a photographer? For one of schemes of solving this problem, it can be considered that there is a scheme in which a face is recognized from an image to determine whether the face is a main subject or not. However, in this scheme, in a scene in which there is a plurality of people, it becomes a problem which person should be set to a main subject.

As described above, the auto focusing (AF) function has various problems to be solved, but for a basic function that is demanded to implement ideal auto focusing (AF), it can be considered that three points below are most critical.

1. To ensure that a main subject is brought into focus.
2. To obtain focus for a short time.
3. To ensure that a subject to be brought into focus is quickly selected among a plurality of possible main subjects.

Furthermore, another basic demand is to reduce costs. It is not preferable to increase costs for implementing the function. For example, such a configuration is desirable that reliably implements quick focus control with no use of an external distance measuring apparatus such as an expensive range sensor.

SUMMARY OF THE INVENTION

Under the circumstances, it is desirable to provide an imaging apparatus, a control method of an imaging apparatus, and a computer program, which allow a quick, accurate Auto focusing process for a target subject.

An embodiment of the invention is an imaging apparatus including: a face detecting part configured to detect a face area from an input image inputted from the imaging apparatus; a subject distance computing part configured to compute a subject distance based on the size of a face detected in the face detecting part; a lens operating range computing part configured to estimate a focus position based on information about the subject distance computed in the subject distance computing part, and to set a focus lens operating range shorter than an entire operating range of a focus lens; and a focus control part configured to move the focus lens within the lens operating range set in the lens operating range computing part, and to decide a position at which the focus lens is set.

In addition, in the imaging apparatus according to an embodiment of the invention, the subject distance computing part is configured to perform a subject distance computing process in which at least anyone of items of subject information for race, gender, age, and body conformation is inputted, and a reference value of the size of a face in accordance with a subject is applied based on the inputted subject information in the subject distance computing process based on the size of a face detected in the face detecting part.

In addition, in the imaging apparatus according to an embodiment of the invention, at least any one of items of the subject information for race, gender, age, and body conformation information is information that is inputted to the subject distance computing part as an analyzed result from an image analyzing part, the result being derived from an input image inputted in the imaging apparatus.

In addition, in the imaging apparatus according to an embodiment of the invention, at least any one of items of the subject information for race, gender, age, and body conformation is information that is inputted to the subject distance computing part through a user input part of the imaging apparatus.

In addition, in the imaging apparatus according to an embodiment of the invention, the subject distance computing part is configured to perform a subject distance computing process to which a reference value of the size of a face in accordance with a subject is applied, and is configured to perform a process in which a reference value of the size of a face is computed as a reference value with a range of certain values, not a single value, and a reference value with the range is applied to compute a subject distance with a range.

In addition, in the imaging apparatus according to an embodiment of the invention, the subject distance computing part is configured to perform a process in which a range from Dfn to Dff of a subject distance is computed in consideration of error occurring in a face template matching process.

In addition, in the imaging apparatus according to an embodiment of the invention, the lens operating range computing part is configured to perform a process in which a focus lens operating range is set based on information about the subject distance computed in the subject distance computing part in consideration of error caused by a device in the imaging apparatus.

In addition, in the imaging apparatus according to an embodiment of the invention, the imaging apparatus further includes a priority analyzing part configured to set a priority of a plurality of faces detected in the face detecting part, wherein the priority analyzing part is configured to perform a face priority decision process using the size of a face, or how a face is close to the center, or at least any one of items of subject information for race, gender, age, and body conformation, as an indicator, and the lens operating range computing part is configured to perform a process in which a focus lens operating range is set based on face priority information decided in the priority analyzing part.

In addition, in the imaging apparatus according to an embodiment of the invention, the lens operating range computing part is configured to perform a process in which a focus lens operating range is set based on information about the subject distance corresponding to a face with the highest priority decided in the priority analyzing part.

In addition, in the imaging apparatus according to an embodiment of the invention, the lens operating range computing part is configured to perform a process in which a range including a plurality of focus lens operating ranges computed based on information about the subject distance corresponding to a plurality of faces in priority order decided in the priority analyzing part is set as a final focus lens operating range.

In addition, in the imaging apparatus according to an embodiment of the invention, the imaging apparatus further includes a display control part configured to put an in-focus mark on a face area in a monitor output image, the in-focus mark showing that focusing is successful, and the monitor output image being determined that focusing is successful based on the decision for a position at which the focus lens is set in the focus control part.

In addition, an embodiment of the invention is a control method of an imaging apparatus which performs auto focusing control in the imaging apparatus, the method including the steps of: detecting a face area in a face detecting part from an input image inputted from the imaging apparatus; computing a subject distance in a subject distance computing part based on the size of a face detected in the face detecting part; estimating a focus position in a lens operating range computing part based on information about the subject distance computed in the subject distance computing part, and setting a focus lens operating range shorter than an entire operating range of a focus lens; and moving a focus lens in a focus control part within the lens operating range set in the lens operating range computing part, and deciding a position at which the focus lens is set.

In addition, in a control method of an imaging apparatus according to an embodiment of the invention, the step of computing a subject distance is the step of performing a subject distance computing process in which at least any one of items of subject information for race, gender, age, and body conformation is inputted, and a reference value of the size of a face in accordance with a subject is applied based on the inputted subject information in the subject distance computing process based on the size of a face detected in the face detecting part.

In addition, in a control method of an imaging apparatus according to an embodiment of the invention, at least any one of items of the subject information for race, gender, age, and body conformation is information that is inputted to the subject distance computing part as an analyzed result from an image analyzing part, the result being derived from an input image inputted in the imaging apparatus.

In addition, in a control method of an imaging apparatus according to an embodiment of the invention, at least any one of items of the subject information for race, gender, age, and body conformation is information that is inputted to the subject distance computing part through a user input part of the imaging apparatus.

In addition, in a control method of an imaging apparatus according to an embodiment of the invention, the step of computing a subject distance is the step of performing a subject distance computing process to which a reference value of the size of a face in accordance with a subject is applied, and is the step of performing a process in which a reference value of the size of a face is computed as a reference value with a range of certain values, not a single value, and a reference value with the range is applied to compute a subject distance with a range.

In addition, in a control method of an imaging apparatus according to an embodiment of the invention, the step of computing a subject distance is the step of performing a process in which a range from Dfn to Dff of a subject distance is computed in consideration of error occurring in a face template matching process.

In addition, in a control method of an imaging apparatus according to an embodiment of the invention, the step of computing a lens operating range is the step of performing a process in which a focus lens operating range is set based on information about the subject distance computed in the subject distance computing part in consideration of error caused by a device in the imaging apparatus.

In addition, in a control method of an imaging apparatus according to an embodiment of the invention, the control method of an imaging apparatus further includes the step of analyzing priority in a priority analyzing part configured to set a priority of a plurality of faces detected in the face detecting part, wherein the step of analyzing priority is the step of performing a face priority decision process using the size of a face, or how a face is close to the center, or at least any one of items of subject information for race, gender, age, and body conformation, as an indicator, and the step of computing a lens operating range is the step of performing a process in which a focus lens operating range is set based on face priority information decided in the priority analyzing part.

In addition, in a control method of an imaging apparatus according to an embodiment of the invention, the step of computing a lens operating range is the step of performing a process in which a focus lens operating range is set based on information about the subject distance corresponding to a face with the highest priority decided in the priority analyzing part.

In addition, in a control method of an imaging apparatus according to an embodiment of the invention, the step of computing a lens operating range is the step of performing a process in which a range including a plurality of focus lens operating ranges computed based on information about the subject distance corresponding to a plurality of faces in priority order decided in the priority analyzing part is set as a final focus lens operating range.

In addition, in a control method of an imaging apparatus according to an embodiment of the invention, the control method of an imaging apparatus further includes the step of display control in display control part, in which an in-focus mark is put on a face area in a monitor output image, the in-focus mark showing that focusing is successful, and the monitor output image being determined that focusing is successful based on the decision for a position at which the focus lens is set in the focus control part.

In addition, an embodiment of the invention is a computer program which performs auto focusing control in an imaging apparatus, the program including the steps of: detecting a face area in a face detecting part from an input image inputted from the imaging apparatus; computing a subject distance in a subject distance computing part based on the size of a face detected in the face detecting part; estimating a focus position in a lens operating range computing part based on information about the subject distance computed in the subject distance computing part, and setting a focus lens operating range shorter than an entire operating range of a focus lens; and moving a focus lens in focus control part within the lens operating range set in the lens operating range computing part, and deciding a position at which the focus lens is set.

Moreover, the computer program according to an embodiment of the invention is a computer program which can be provided in a computer readable format for a multi-purpose computer system that can execute various program codes, for example, in a recording medium such as CD, FD, or MO, or via a communication medium such as a network. Such a program is offered in the computer readable format, whereby processes can be implemented on the computer system in accordance with the program.

Other purposes, features and advantages according to an embodiment of the invention will be apparent from more detailed descriptions with reference to implementations of an embodiment of the invention and the accompanying drawings, described later. Moreover, a system in the specification is a logically assembled configuration formed of a plurality of devices, which is not limited to those having devices in individual configuration inside the same housing.

In the configuration according to an embodiment of the invention, in an Auto focusing process in the imaging apparatus, the face area is detected from the input image, the subject distance is computed based on the size of the detected face, and the focus position is estimated based on the information about the computed subject distance. In addition, based on the estimated focus position, the focus lens operating range is set that is shorter than the entire operating range of the focus lens, and the focus lens is moved within the set lens operating range to decide the position at which the focus lens is set. According to the configuration, the distance can be set for the lens to be moved in focus control, and accelerated focus control can be implemented.

In addition, in accordance with the configuration according to an embodiment of the invention, in the subject distance computing process, it is configured to perform the subject distance computing process in which at least any one of subject information for race, gender, age, and body conformation is inputted, and a reference value of the size of a face in accordance with the subject is applied based on the inputted subject information. Therefore, a more accurate subject distance adaptive to the subject can be computed, and accurate focus control can be implemented.

In addition, in accordance with the configuration according to an embodiment of the invention, the priority analyzing part is configured to perform a process in which a priority of a plurality of faces detected in the face detecting part is decided using subject information such as the size of a face, or how a face is close to the center, or race, gender, age, and body conformation, as an indicator, and the focus lens operating range is set based on the decided priority information for the face. Accordingly, even though a plurality of faces is detected, focus control can be performed efficiently for the face with a higher priority.

BRIEF DESCRIPTION OF THE DRAWINGS

FIGS. 3A and 3B show diagrams illustrative of examples of driving a lens in focus control;

FIG. 6 shows a diagram illustrative of information about the subject distance computed based on the size of a face and an exemplary setting for the operating range of a focus lens;

FIG. 7 shows a diagram illustrative of the configuration and the process of a face size reference value computing part.

FIGS. 8A and 8B show diagrams illustrative of exemplary reference value computing tables which are applied to the face size reference value computing part;

FIG. 9 shows a diagram illustrative of an exemplary reference value computing table which is applied to the face size reference value computing part;

FIG. 10 shows a diagram illustrative of an exemplary reference value computing table which is applied to the face size reference value computing part;

FIG. 11 shows a diagram illustrative of information about the subject distance computed based on the size of a face and an exemplary setting for the operating range of a focus lens;

FIG. 15 shows a diagram illustrative of exemplary in-focus marks;

DETAILED DESCRIPTION OF THE INVENTION

Hereinafter, the detail of an imaging apparatus, a control method of an imaging apparatus, and a computer program according to an embodiment of the invention will be described.

An embodiment of the invention discloses a configuration which allows quick, accurate auto focusing a target subject. In the imaging apparatus according to an embodiment of the invention, for a scheme of focus control, such a scheme is used as the basis that determines whether the contrast of imaging data obtained through a lens is high or low. It is an adjusting scheme in which a particular area in a taken image is set as a signal acquisition area for focus control (which is an area for extracting a spatial frequency), it is determined that it is in focus when the contrast of the particular area is higher whereas it is out of focus when the contrast is lower, and a lens is driven to the position at which the contrast is made higher.

More specifically, such a scheme is adapted in which a high frequency component in a particular area is extracted, integration data of the extracted high frequency component is generated, and it is determined whether the contrast is high or low based on the generated integration data of the high frequency component. In other words, in order to determine whether the contrast is high or low, an integration value of a high frequency component in a particular area is computed, and is used as an evaluation value (AF evaluation value). A focus lens is driven so that the evaluation value is the maximum, whereby auto focusing is implemented. In order to perform auto focusing, it is necessary to drive the lens as the evaluation value is a guideline. For example, for a lens drive mechanism, a voice coil motor may be used.

In an embodiment of the invention, in focus control using such contrast determination processing, the size of a face of a person is determined as a target subject, a distance to the subject is estimated based on the size, and estimated information is applied to narrow the range of focus control to allow quick focus control. In addition, an embodiment of the invention allows more accurate implementation of the estimation of the distance to a subject based on the size of a face in consideration of differences in the size of faces of individuals, races, ages, gender, etc.

Figure 1A:
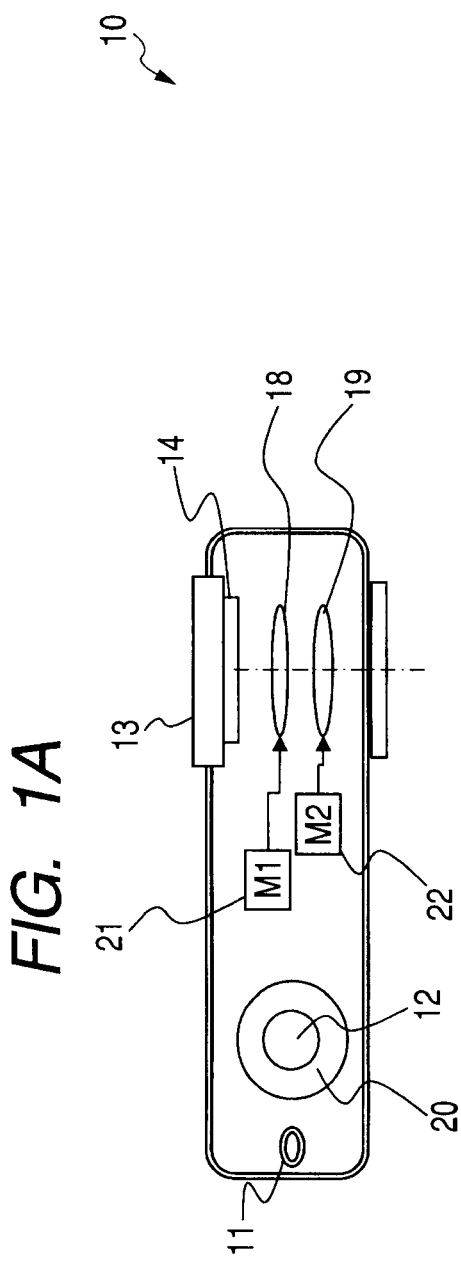
FIGS. 1A, 1B and 1C show diagrams illustrative of an exemplary configuration of the appearance of an imaging apparatus according to an embodiment of the invention.
Figure 1C:
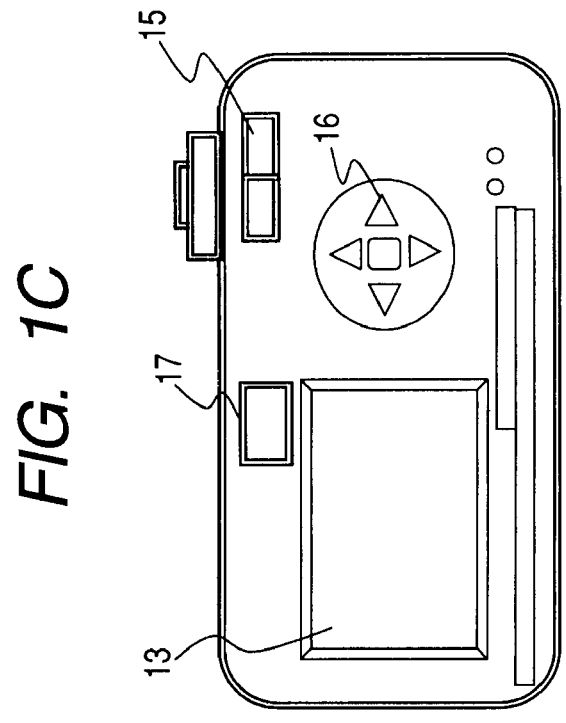
Figure 1B:
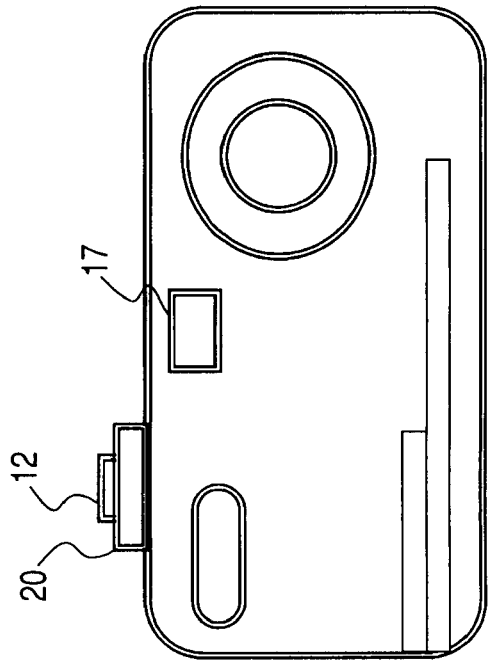

First, the configuration of the imaging apparatus according to an embodiment of the invention will be described with reference to the drawings. FIGS. 1A, 1B and 1C show diagrams depicting the appearance of an imaging apparatus 10 according to an embodiment of the invention. FIG. 1A shows a top view of the imaging apparatus 10, FIG. 1B is a front view, and FIG. 1C is a rear view. In the top view of FIG. 1A, a lens portion is shown as a cross section. The imaging apparatus 10 has a power switch 11, trigger means which sets a timing to capture an image, that is, a release switch 12 which functions as a shutter button, a monitor 13 which displays an image (through image) taken by the imaging apparatus and operation information, an imager 14 as an imaging device (CCD), a zoom button 15 for zooming control, a manipulation button 16 which enters information of various operations, an electronic viewfinder 17 which confirms an image (through image) taken by the imaging apparatus, a focus lens 18 which is driven in focus adjustment, a zoom lens 19 which is driven in zooming adjustment, a mode dial 20 which sets shooting modes, a focus lens motor (M1) 21 which drives the focus lens 18, and a zoom lens motor (M2) 22 which drives the zoom lens 19.

A subject image is displayed on the electronic view finder 17 and the monitor 13. The electronic viewfinder 17 and the monitor 13 are configured of an LCD, for example, on which the subject image is displayed as a moving image through the lens. The moving image is called a through picture. A user confirms to approve a target subject to shoot through the electronic viewfinder 17 or the monitor 13, and then presses the release switch 12 as a shutter button, whereby a recording process for an image is performed.

The internal configuration of the imaging apparatus 100 according to an embodiment of the invention will be described with reference to FIG. 2. The imaging apparatus according to an embodiment of the invention is an imaging apparatus having an auto focusing function. Incident lights through a focus lens 101 and a zoom lens 102 enter an imaging device 103 such as a CCD (Charge Coupled Device), and are subjected to photo-electric conversion in the imaging device 103. The photo-electric conversion data is inputted in an analog signal processing part 104, subjected to noise filtering in the analog signal processing part 104, and converted into digital signals in an A/D converting part 105. The data digitally converted in the A/D converting part 105 is recorded on a recording device 115 configured of a flash memory, for example. In addition, it is displayed on a monitor 117 and an electronic viewfinder (EVF) 116. On the monitor 117 and the electronic viewfinder (EVF) 116, an image through the lens is displayed as a through picture regardless of whether to shoot it or not.

A manipulating part 118 is a manipulating part including the release switch 12, the zoom button 15, the manipulation button 16 which enters information of various operations, the mode dial 20 which sets shooting modes, and so on in the camera main body described with reference to FIGS. 1A, 1B and 1C. A control part 110 has a CPU, which performs control for various processes done by the imaging apparatus in accordance with a program stored in advance in a memory (ROM) 120, for example. A memory (EEPROM) 119 is a non-volatile memory, in which image data, various items of sub-information, programs and so on are stored. A memory (ROM) 120 stores therein programs and computation parameters used by the control part (CPU) 110. A memory (RAM) 121 stores therein programs and parameters properly changing in execution used by the control part (CPU) 110. A gyro 111 detects the inclination and vibrations of the imaging apparatus, for example. Detected information is inputted into the control part (CPU) 110, to which a process to stabilize an image is applied, for example.

A motor driver 112 drives a focus lens drive motor 113 arranged as corresponding to the focus lens 101, and a zoom lens drive motor 114 arranged as corresponding to the zoom lens 102. A vertical driver 107 drives the imaging device (CCD) 103. A timing generator 106 generates control signals for timings of processes for the imaging device 103 and the analog signal processing part 104, and timings of processing the individual processing parts.

A face detecting part 130 analyzes image data inputted through the lens, and detects a person's face in the image data. Face detection information is sent to the control part 110, and in the control part 110, the size of the person's face as a target subject is determined based on the detected face information, and a distance to the subject is estimated based on the size. In addition, this estimated information is applied to narrow the range of focus control for quick focus control. In addition, in the subject distance estimation process based on the size of a face, such a process is performed that considers the differences in the size of faces of individuals, races, ages, gender, and so on, whereby accurate distance estimation is implemented.

In the imaging apparatus according to an embodiment of the invention, as described above, in focus control, such a scheme is basically used that determines whether the contrast of imaging data captured through the lens is high or low, but in focus control using this contrast determination process, the size of a person's face as a target subject is determined, the distance to the subject is estimated based on the size, and this estimated information is applied to narrow the range of focus control for allowing quick focus control.

In a focus position determination process based on contrast, an integration value of a high frequency component in a particular area is computed, and this value is used as an evaluation value (AF evaluation value). The focus lens is driven so that the evaluation value is the maximum, whereby auto focusing is implemented. As a specific auto focusing control process, there are methods, including a method in which a focus lens is servoed so that an AF evaluation value keeps a peak (hill-climbing method), and a method in which evaluation value data is taken at certain intervals in a certain area and a focus lens is moved at a focus position at which the maximum value is taken among evaluation values (possible area search).

In the hill-climbing method in which the focus lens is servoed so that the AF evaluation value keeps the peak, it takes time to come into focus, although it offers optimum focus all the time. Furthermore, in the possible area search in which evaluation value data is taken at certain intervals in a certain area and the focus lens is moved at the focus position at which the maximum value is taken among evaluation values, the lens comes into focus for a short time almost all the scenes, but it has a problem that the lens comes into focus only at a certain moment and the lens is out of focus when a subject moves.

In the imaging apparatus according to an embodiment of the invention, a person's face is detected in image data in the face detecting part 130. In the control part 110, the size of the person's face as a target subject is determined based on the detected face information, and the distance to the subject is estimated based on the size. The operating range is narrowed and set for the focus position search process based on the hill-climbing AF method or point to point search AF method, and the focus position search process is performed based on any one of the hill-climbing AF method and the point to point search AF method for quick focus control. In addition, in the estimation of the distance to the subject based on the size of a face, the estimation of the distance to a subject is performed in consideration of the differences in the size of faces of individuals, races, ages, gender, and so on for implementing accurate distance estimation.

FIG. 3A shows the focus lens operating range in the focus control in the related art, and FIG. 3B show the focus lens operating range in focus control to which estimated distance information is applied based on face detection according to an embodiment of the invention. When typical auto focusing control is performed, as shown in FIG. 3A, the operating range of a focus lens 201 is set to the entire range from a lens-to-subject side limit to an infinite side limit, the focus lens 201 is moved within this range, and it is determined whether the contrast is high or low in the particular area in imaging data captured through the lens. In other words, in order to determine whether the contrast is high or low, the integration value of the high frequency component in the particular area is computed, this is set to an evaluation value (AF evaluation value), the position at which the AF evaluation value is the maximum is considered to be the focus position. When such a process is performed, problems arise that the operating range of the focus lens 201 is large, and that the execution time for focus control is prolonged.

On the other hand, in focus control to which estimated distance information is applied based on face detection according to an embodiment of the invention shown in FIG. 3B, the size of a person's face as a target subject is determined, a distance to the subject is estimated based on the size, and this estimated information is applied to narrow the range of focus control for quick focus control. In other words, as shown in FIG. 3B, the distance to the subject is estimated based on the size of the person's face as a target subject, an area including an error range set in advance is set as the operating range of the focus lens 201 (Rf) around this distance (DF), the focus lens 201 is moved only in the operating range (Rf), it is determined whether the contrast is high or low, and then the focus position is decided. In this process, the operating range of the focus lens 201 is narrowed to shorten the time necessary to determine the focus position.

The following is more specific process sequences. Moreover, the area to determine the difference in the contrast signals of the imaging device, that is, the particular area which is set to determine whether the contrast is high or low is an area including a face area detected from a through picture. Based on the contrast signal obtained from this area, the following operation is performed to implement the acceleration of auto focusing.

1. Before a release button is pressed, the focus lens is servoed at the position at which the contrast signal is the maximum. The lens operating range in focus control at this time is limited to Rf.

2. At the time when the release button is pressed, when the contrast signal is kept near the maximum value, that is, when the contrast is equal to or greater than a threshold set in advance and is in the area in which fluctuations in the contrast are hardly varied due to changes in the focus position, the image is captured as it is, whereas the image is locked when the release button is pressed halfway.

3. When the contrast signal is not near the maximum value at the time when the release button is pressed, the position is detected at which the contrast is the maximum in the lens operating range Rf in accordance with "the possible area search", the focus position is moved to the position, and then the image is captured as it is, whereas the image is locked when the release button is pressed halfway.

4. The operating range Rf of the lens is updated every time when the detected result of the face is changed.

Figure 4:
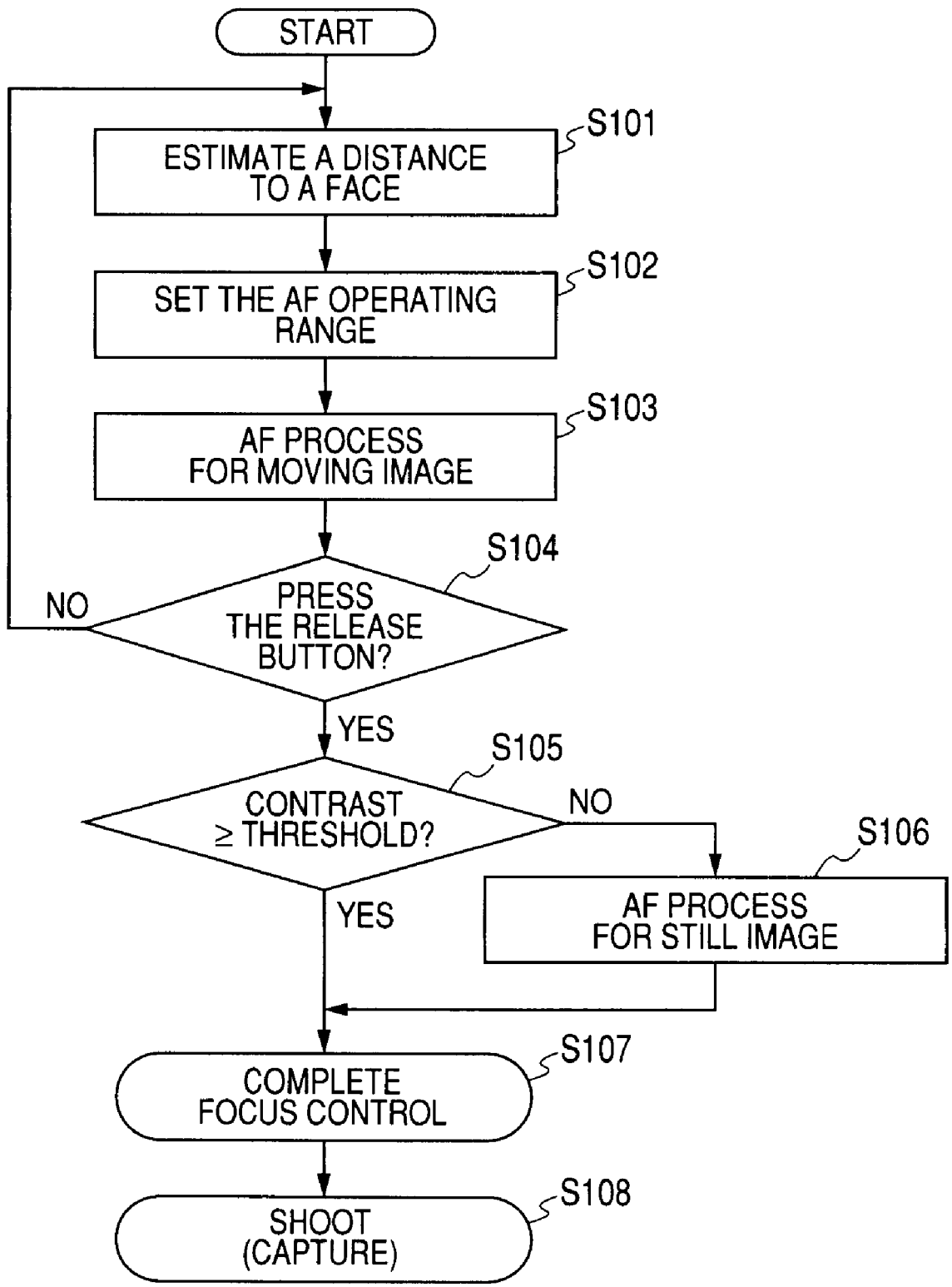
FIG. 4 shows a diagram depicting a flowchart illustrative of an auto focusing control sequence of the imaging apparatus according to an embodiment of the invention.

A specific focus control process sequence corresponding to the description above will be described with reference to a flow chart shown in FIG. 4. First, at Step S101, the face area of a target subject is detected from a subject image (through picture) captured by the imaging apparatus, the detected size of a person's face as the target subject is determined, and a distance to the subject is estimated based on the size.

At Step S102, as shown in FIG. 3B, as the distance (DF) is centered that is estimated based on the size of a person's face as the target subject, an area including an error range set in advance is set as the operating range of the focus lens, that is, as an AF operating range. At Step S103, an Auto focusing process for a moving image, that is, auto focusing control is performed to display an image displayed on the monitor as an image that a person's face as the target subject comes into focus. As long as the press of the release button is not detected at Step S104, the process steps from Step S101 to S103 are continuously performed.

At Step S104, when the press of the release button is detected, the process goes to Step S105. It is determined whether the contrast signal is kept near the maximum value, that is, whether the contrast is equal to or greater than the threshold set in advance.

At Step S105, when it is determined that the contrast is equal to or greater than the threshold set in advance, it is determined that correct focus control is done, and the process goes to Step S107 to complete focus control. At Step S108, a process is performed to shoot (capture) the image. On the other hand, at Step S105, when it is determined that the contrast is not equal to or greater than the threshold set in advance, it is determined that correct focus control is not done, and the process goes to Step S106 to perform auto focusing control for shooting a still image. The area in which the focus lens moves in this case is the operating range (Rf) including the error range set in advance as the estimated distance (Df) is centered based on the size of a person's face as the target subject described with reference to FIG. 3B above. In this process, the focus position is determined based on whether the contrast of the particular area including the face area is high or low, and then the process goes to Step S108 to complete focus control. At Step S108, the process is performed to shoot (capture) the image.

The most primary point in an embodiment of the invention is the method in which error information for distance is used to decide a narrower AF range as much as possible in the case in which a distance to a face is determined based on the size of the face. Accordingly, auto focusing can be implemented for a short time.

A person's face of the target subject is determined from image data captured by the imaging apparatus according to an embodiment of the invention, and the distance to the face is estimated. Hereinafter, a more specific process configuration of this process will be described. The descriptions will be made in order of the following items.

1. Face recognition process.
2. Schemes of computing the distance to a face and setting the operating range of the focus lens (Rf).
3. Auto focusing process when there is a plurality of faces.

1. Face Recognition Process

First, a scheme of determining a person's face from image data captured by the imaging apparatus will be described. For techniques of face recognition and tracking, various techniques are already disclosed, and the existing techniques can be applied. For example, as described in JP-A-2004-133637, it is implemented that a matching is performed on a real image with a template on which face brightness distribution information is recorded. First, multiple types of images are prepared, in which real images are processed for scaling down. A group of templates of face brightness distribution information is prepared; the information is obtained when a face is tilted. Then, they are matched with each other one by one. This template is a template that is inclined to the individual X, Y, and Z-axes of a three dimensional orthogonal coordinate system of the face, and the inclination of an actual face is determined by matching with the template.

A matching is in turn performed to the scaled down image while the two dimensional plane is being shifted. When a certain area is matched with the template, the area is the position at which the face exists, and the size can be determined from the scale down factor of the real image. In addition, a rotation angle, yaw, pitch, and roll angle about the three orthogonal axes can be determined from the template used at that time. The size of a face, the position, and the rotation angle thus determined are used to estimate the distance to the face for auto focusing control, whereby the operating range of the focus lens (Rf) can be set smaller as described with reference to FIG. 3B above.

2. Schemes of Computing a Distance to a Face and Setting the Operating Range of the Focus Lens (Rf)

Hereinafter, more specific schemes of computing a distance to a face and setting the operating range of the focus lens (Rf) will be described. In the scheme of computing the distance based on the size of a face proposed in accordance with an embodiment of the invention, it is configured in which the determined distance ((Df) shown in FIG. 3B) includes distance error information to set the operating range of the focus lens (Rf).

Figure 5:
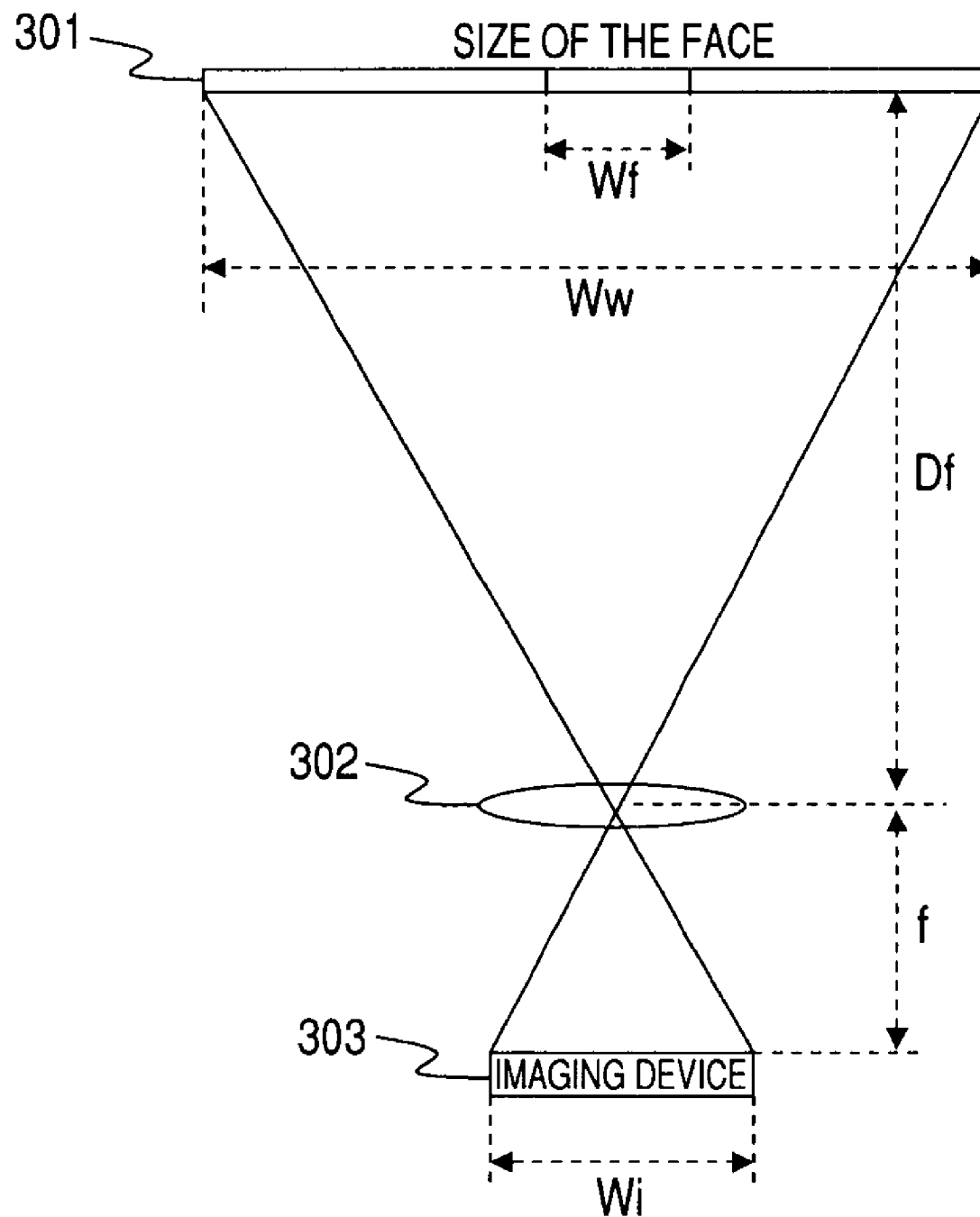
FIG. 5 shows a diagram illustrative of based on the size of a face the subject distance computing process.

In the imaging apparatus according to an embodiment of the invention, a distance to a face is determined based on the size of the face included in the image taken by the imaging apparatus. This process will be described with reference to FIG. 5. FIG. 5 shows a subject position 301, a focus lens 302, and an imaging device 303. At the subject position 301, a person's face exists. The size of a face (the width of a face) is Wf.

When the actual size (Wf) of the face is found, the distance to the face, that is, the subject distance (Df) can be determined from the basic physical law of the lens. In other words, the subject distance (Df) from the focus lens 302 to the subject position 301 can be determined by the following equation.

$$Df = Wref \times (f/Wi) \times (Ww/Wf) \quad \text{(Equation 1.1)}$$

The following is the description of signs in the equation above.

Human face size reference value: Wref
Width of the imaging device: Wi
Focal length: f
The number of pixels of the human face size in the taken image (the value detected by the imaging device): Wf
The number of pixels of the size of the image for use in human face detection (the value detected by the imaging device): Ww For the human face size reference value (Wref), a predetermined fixed value can be used. Moreover, the face size reference value (Wref) can be set to the value in consideration of the differences in individuals, races, ages, gender, and soon for processing. With this process, more accurate distance estimation can be implemented. The process configuration will be described later.

In the imaging apparatus, the above equation (Equation 1.1) is applied to compute the subject distance (Df) based on the image to be taken (the through picture), and the operating range of the focus lens (Rf) is set including the error range set in advance as the computed subject distance (Df) is centered.

Suppose that such a model is assumed that error determined from the size of a face is zero. The factor that focus is not achieved when the focus lens is moved to this position is restricted to individual differences in various devices and error caused in fabrication. More specifically, suppose that these errors can be removed by adjustment, in principles, a picture in excellent focus can be provided using only the size of a face with no use of the hill-climbing AF method or possible area search.

However, in practice, it may not possible to completely remove these errors. More specifically, it is because of nonlinear focus movement in the focal length direction, the movement of the focus position of the device caused by the device temperature characteristics, and hysteresis among various devices. In the form in which these quantities are listed in a data table at every zooming position and focus position, and data between tables is linearly complemented, the error range is then set where σn is on the lens-to-subject side and σf is on the infinite side. The operating range of the focus lens (Rf) is set as below where a distance to a face is Df.

$$Rf = Df - \sigma n \text{ to } Df + \sigma f \quad \text{(Equation 1.2)}$$

In other words, the operating range (Rf) of the focus lens 302 is set as shown in FIG. 6.

Therefore, for example, the area to search the maximum value of the contrast signal can be set as the operating range (Rf) in accordance with the hill-climbing method that is one of schemes of focus control based on contrast determination. The maximum value of the area to search at the time when the release button is pressed can be also set as the range above. As compared with the schemes in the related art, the lens moving range with a shorter distance is set to allow focus control for a short time.

However, such a distance estimation process based on the size of a face has problems below.

Problem 1: There are variations in the size of a face caused by the differences in race, gender, age, and body conformation.

Problem 2: The limitation of capability of template matching (the resolution of the real image scale down factor)

Method of Solving Problem 1

A solving method of the first problem is that the face size reference value Wref is set to a proper value in accordance with race, gender, age, and body conformation corresponding to the subject. To this end, it is configured to compute and use the reference values Wref corresponding to various items of race, gender, age, and body conformation. For example, it is configured in which table data is held that computes the reference values Wref corresponding to various items of race, gender, age, and body conformation; items of race, gender, age, and body conformation information corresponding to the subject are acquired based on the image analysis result or the user input information; and the face size reference value Wref in accordance with the subject is determined from the table based on the acquired information.

The face image included in the image taken by the imaging apparatus is analyzed to estimate the race, gender, age, and body conformation of a person of the face. In other words, the parts of a face are distinguished, matching is performed for the parts information corresponding to race, gender, age, and body conformation registered in advance, and the race, gender, age, and body conformation of the subject are estimated. Alternatively, such a configuration may be done in which a user such as a photographer enters subject information relating to race, gender, age, and body conformation as subject information, and the input information is applied.

As described above, items of race, gender, age, and body conformation information of the subject are acquired as image analysis or user input information, and the adequate face size reference value Wref in accordance with the subject is determined. An exemplary process thereof will be described with reference to FIG. 7.

As shown in FIG. 7, the imaging apparatus has a face size reference value (Wref) computing part 310. The face size reference value (Wref) computing part 310 has a race reference value computing table 311, a gender reference value computing table 312, an age reference value computing table 313, a body conformation reference value computing table 314, and a data processing part 320.

The image analyzing part 331 analyzes the face image included in the image taken by the imaging apparatus to estimate the race, gender, age, and body conformation of a person of the face. In other words, the parts of a face are distinguished, matching is performed for the parts information corresponding to race, gender, age, and body conformation registered in advance, the race, gender, age, and body conformation of the subject are estimated, and the estimated information is inputted to the face size reference value (Wref) computing part 310. Alternatively, a user such as a photographer enters subject information relating to race, gender, age, and body conformation as subject information through the user input part 332, and the input information is inputted to the face size reference value (Wref) computing part 310.

The face size reference value (Wref) computing part 310 computes the optimum reference value (Wref) in accordance with the subject by applying each table based on subject information through the image analyzing part 331, or inputted through the user input part 332. For the actual output, in consideration of variations to some extent, the range of the reference value Wref=(Wref+ΔWrefb) to (Wref−ΔWrefs) is computed. The result is outputted in consideration that a shift to a greater side estimated is ΔWrefb, and a shift to a smaller side is ΔWrefs.

Exemplary data configurations of tables will be described with reference to FIGS. 8A to 10. FIG. 8A shows a race reference value computing table, FIG. 8B shows a race and gender reference value computing table, FIG. 9 shows a race, gender, and age reference value computing table, and FIG. 10 shows a race, gender, age, and body conformation reference value computing table. In the exemplary configuration shown in FIG. 7, an example is described in which individual tables are prepared for race, gender, age, and body conformation, but various settings may be done for table configuration as shown in FIGS. 8A to 10 in addition to individual tables.

For example, when only race can be estimated/determined based on subject information inputted through the image analyzing part 331 or the user input part 332, the race reference value computing table shown in FIG. 8A is used. Suppose that when race cannot be determined, "common" data is to be used.

When race and gender can be estimated/determined based on subject information inputted through the image analyzing part 331 or the user input part 332, the race and gender reference value computing table shown in FIG. 8B is used. Suppose that when the person is Asian male, data in Row A in FIG. 8B is to be used. On the other hand, for example, when it is estimated/determined that race cannot be determined but gender is female, data in Row B in FIG. 8B is used showing that race is common and gender is female.

Similarly, when age can be estimated/determined, the race, gender, and age reference value computing table shown in FIG. 9 is used. Suppose that when it is found that the person is Asian male over 12 years old, data in Row C in FIG. 9 is used. When it cannot be estimated with some reason, data in Row D in FIG. 9 is used. Similarly, when the items can be estimated/determined to body conformation, the race, gender, age, and body conformation reference value computing table shown in FIG. 10 is used to compute the optimum reference value Wref=(Wref+ΔWrefb) to (Wref−ΔWrefs).

As described above, items of race, gender, age, and body conformation information of the subject are acquired as image analysis or user input information, and an adequate face size reference value Wref can be determined in accordance with the subject. The computed reference value Wref is applied to compute the distance (Df) to the subject more accurately. Moreover, in the process of applying the reference value Wref and the process of computing the distance (Df) to the subject, such configurations can be done: in which any one of face's breadth and face's vertical length is applied, and in which both are combined. In addition, such a process configuration may be done in which the inclination is considered.

Method of Solving Problem 2

Next, a method of solving Problem 2 described above, that is, a method of solving the limitation of capability of template matching (the resolution of the real image scale down factor, for example) will be described. As described above, template matching is performed to determine a face area from a taken image. In other words, it is a process in which a group of templates of face brightness distribution information corresponding to various inclinations of the face is prepared, the taken image is subjected to scaling down processing for matching with the scaled down image. Matching is in turn performed with the scaled down image while it is being shifted over the two dimensional plane, and then a certain area is matched with the template, which means that the area is the position at which the face exists, and the size can be determined from the scale down factor of the real image.

However, there is a problem of the limitation of capability of template matching (the resolution of the real image scale down factor, for example). For measures to this problem, an effective measure is to perform a process in consideration of these errors in advance. The detection error is a problem that can arise separated from the differences in race, gender, age, etc. It can be expected to enhance accuracy by recording various items of face data on the face template, and by increasing the number of positions to make matching, but there are always limitations. For example, when the face in the taken image is dark, error is large, whereas when the face tilts, error is great. The detection error can occur because of these circumstances such as the inherent limitations of performance, the disadvantageous intensity for detection, and the inclination of the face, and the process is performed in consideration of errors in association with these circumstances.

A more specific exemplary process will be described. For the face size Wf detected from a taken image, intensity information from an intensity detecting unit, for example, is used to determine a face size Ws that is determined smallest, and a face size Wb that is determined greatest in template matching. These are decided in consideration of factors to cause detection error, that is, error factors caused by these circumstances such as the limitations of detection process performance, the disadvantageous intensity for detection, and the inclination of the face.

Subsequently, by the process to which the race, gender, age, and body conformation reference value computing tables are applied as described with reference to FIGS. 7 to 10, the face size reference value Wref=(Wref+ΔWrefb) to (Wref−ΔWrerfs) is computed. This is an example in which the distance to the subject is set in a certain range where a shift in the greater direction assumed is ΔWrefb, and a shift in the smaller direction is ΔWrefs.

At this time, for the face size reference value (Wref), and the number of pixels of the human face size in the taken image (the value detected by the imaging device) (Wf), the following is set.

$Wref=Wref+\Delta Wrefb,$ $Wf=Ws$

Then, the equations Wref=Wref+ΔWrefb, and Wr=Ws are substituted into the equation for computing the subject distance (Df) described above, that is, Df=Wref×(f/Wi)×(Ww/Wf) (Equation 1.1). The result (Dff) is the case in which error extends furthermost.

On the other hand, for Wref and Wf, the following is set.

$Wref=Wref-\Delta Wrefs,$ $Wf=Wb$

Then, the equations Wref=Wref−ΔWrefs, and Wr=Wb are substituted into the equation for computing the subject distance (Df) described above, that is, Df=Wref×(f/Wi)×(Ww/Wf) (Equation 1.1). The result (Dfn) is the case in which error extends nearest.

In other words, as shown in FIG. 11, the subject distance (Df) computed from the face size of the subject image is not a single point, which is set as a range in consideration of error in image analysis such as template matching and human error. More specifically, as shown in FIG. 11, it is set as a distance from Dfn to Dff.

For the subject distance (Dfn to Dff), the operating range of the focus lens (Rf) is set including the error range computed in advance. As discussed above, the error range is set such that σn is on the lens-to-subject side, and σf is on the infinite side in consideration of non-linear focus movement in the focal length direction, the movement of the focus position of the device caused by the device temperature characteristics, and hysteresis among various devices. Then, the operating range of the focus lens (Rf) is computed in accordance with the following equation (Equation 1.3).

$Rf=(Dfn-\sigma n)$ to $(Dff+\sigma f)$ (Equation 1.3)

As described above, in the configuration according to an embodiment of the invention, the subject distance (Df) computed from the face size of the subject image is not a single point, which is grasped as a certain "range from Dfn to Dff" in consideration of error in image analysis such as template matching and human error, and settings are made in consideration of error. This is one of important features according to an embodiment of the invention.

3. Auto Focusing Process when a Plurality of Faces Exists

Next, the detail of the auto focusing process when a plurality of faces exists in an image will be described. When a plurality of faces exists in an image, the same processes as those described above are performed to all the faces to determine the operating range of the focus lens (Rf) corresponding to the individual faces.

A method of selecting a face is important here. One indicator is the size of a face, that is, how the face is close to the camera. Another indicator is how the face is close to the center. It is necessary to change them adaptively.

Then, when the size of a face is greater than a predetermined threshold (Film), the face is most prioritized, and when there is a plurality of faces exceeding the threshold (Film), the faces are prioritized in descending order. When there are faces in the same size, a higher priority is given in order close to the center. When the size of all the faces is equal to or below the threshold (Film), a higher priority is given to the face most close to the center. When faces are at the same distance from the center, the faces are prioritized in descending order. With this process steps, a single face with the highest priority is selected. These process steps will be described with reference to flow charts shown in FIGS. 12 and 13.

Figure 2:
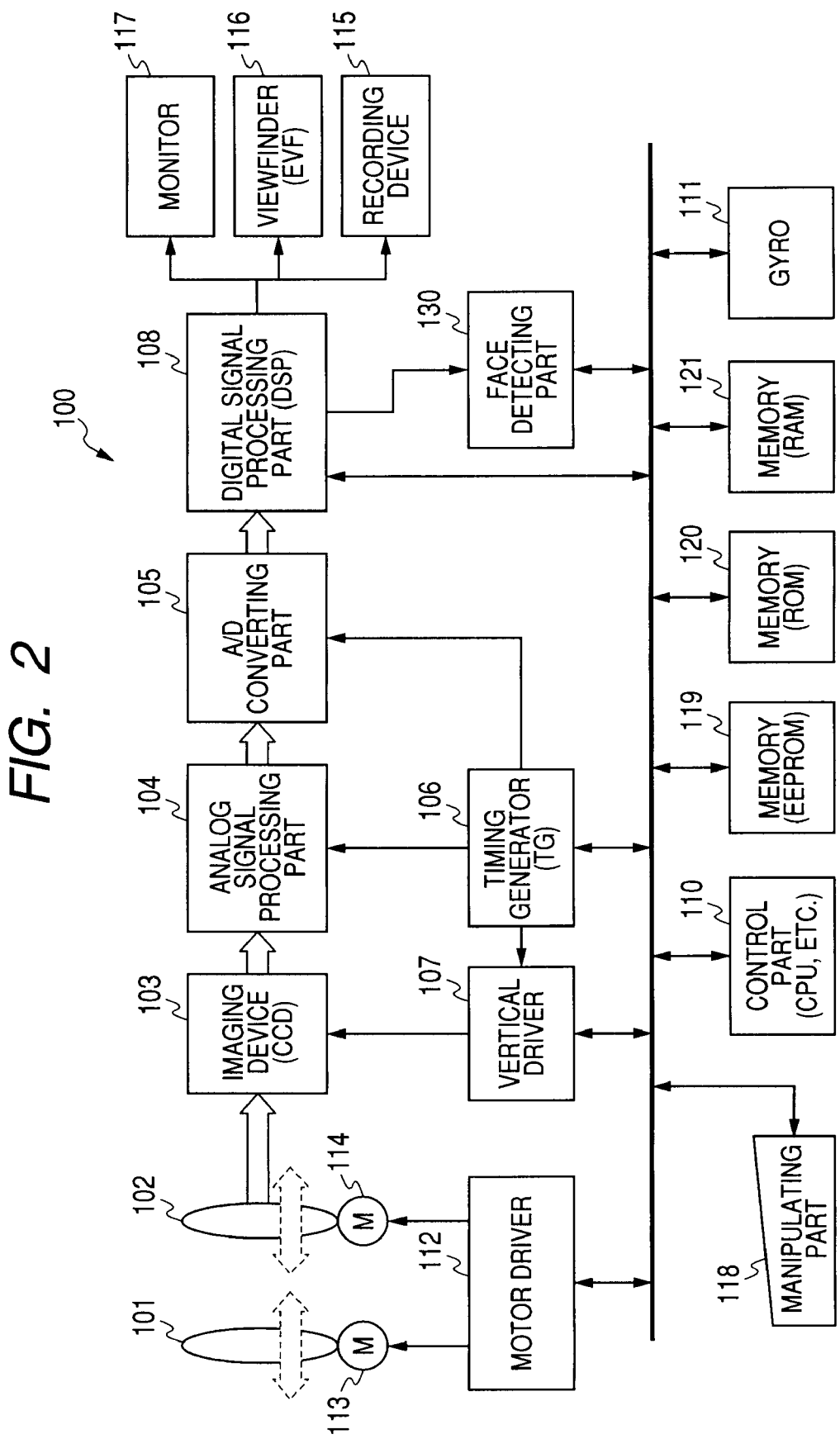
FIG. 2 shows a diagram illustrative of an exemplary hardware configuration of the imaging apparatus according to an embodiment of the invention.
Figure 12:
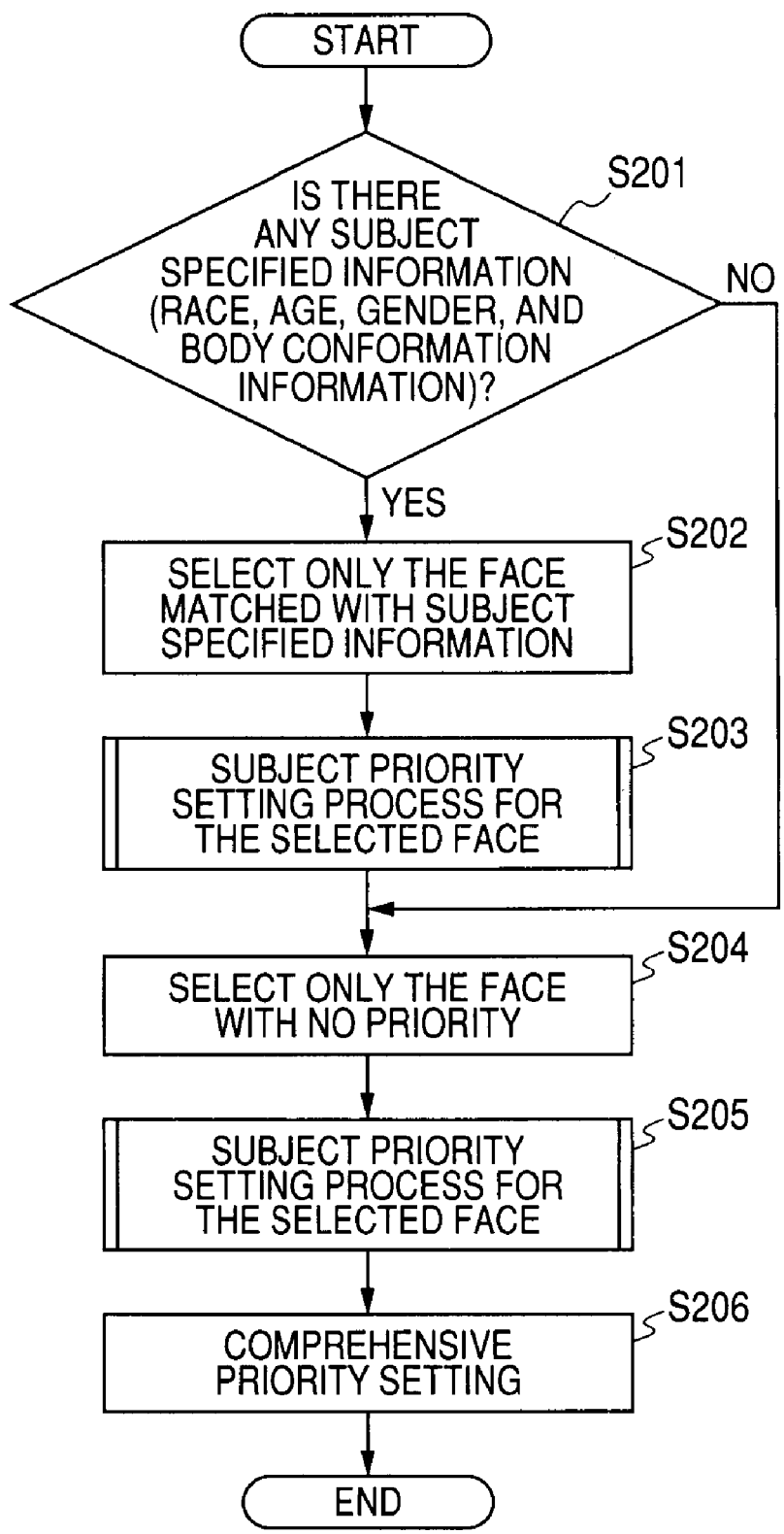
FIG. 12 shows a diagram depicting a flowchart illustrative of an exemplary priority setting process sequence for a subject.
Figure 13:
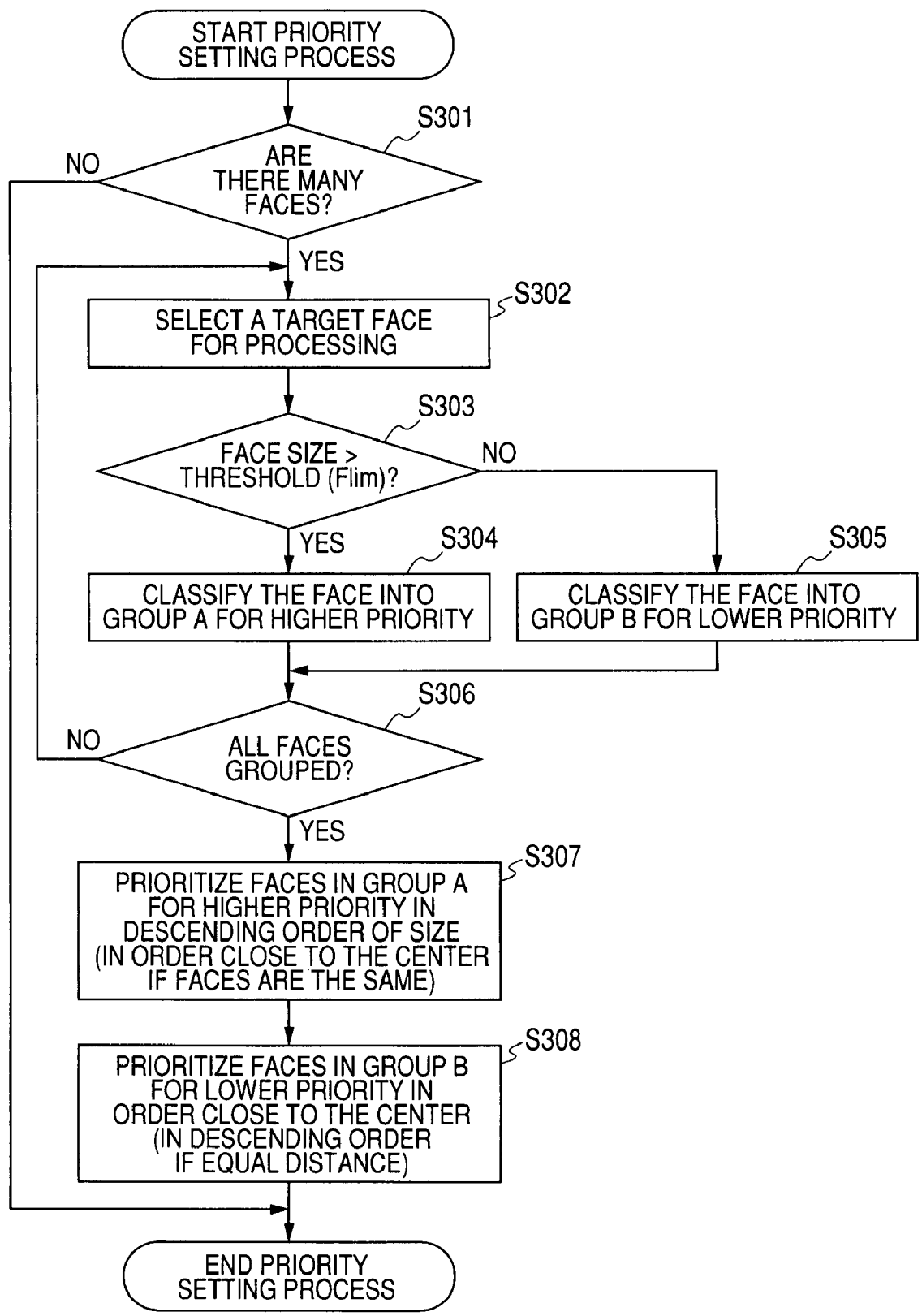
FIG. 13 shows a diagram depicting a flowchart illustrative of an exemplary priority setting process sequence for a subject.

The process steps shown in FIGS. 12 and 13 are performed under control done by the control part 110 of the imaging apparatus shown in FIG. 2. First, at Step S201, it is determined whether there is subject specified information (race, age, gender, and body conformation information). The subject specified information is inputted from the manipulating part as the user input part.

When there is no subject specified information (race, age, gender, and body conformation information), the process goes to Step S204. When there is subject specified information (race, age, gender, and body conformation information), the process goes to Step S202. Only a face matched with the subject specified information is selected, and the process goes to Step S203 to perform the subject priority setting process for the selected face. The detail of the subject priority setting process will be described later with reference to a flow shown in FIG. 13.

At Step S203, after the priority setting process is completed for the face matched with the subject specified information, the process goes to Step S204 to select only a face with no priority. The process goes to Step S205 to perform the subject priority setting process for the selected face. The detail of the subject priority setting process will be described later with reference to the flow shown in FIG. 13.

Finally, the process goes to Step S206. The priority of the face that is decided at Step S203 and matched with the subject specified information is combined with the priority decided at Step S205 to perform a comprehensive priority setting process. The priority setting process is performed in which the priority of the face matched with the subject specified information is prioritized more than the priority of the face not matched with the subject specified information.

Next, the detailed process steps of the priority setting processes done at Steps S203 and S205 will be described with reference to the flow chart shown in FIG. 13. First, at Step S301, it is determined whether there is a plurality of faces in a taken image (through picture) for a process target. When there is not a plurality of faces, the process is ended because it is not necessary to set priority.

When there is a plurality of faces in a taken image (through picture) for a process target, the process goes to Step S302 to select a single face as a process target from a plurality of faces. Then, at Step S303, it is determined whether the size of the selected face is greater than a threshold (Film) set in advance. When it is greater, the process goes to Step S304 to classify the face into Group A with higher priority. When it is smaller, the process goes to Step S305 to classify the face into Group B with lower priority.

Subsequently, at Step S306, it is determined whether the grouping of all the faces is finished. When there is the face not grouped, the process returns to Step S302 to repeat the similar process steps. At Step S306, when it is determined that the grouping of all the faces is finished, the process goes to Step S307 to prioritize the faces in Group A with higher priority in descending order. When they are in the same size, they are prioritized in order close to the center. Subsequently, the process goes to Step S308 to prioritize the faces in Group B with lower priority in order close to the center. When they are at the equal distance, they are prioritized in descending order. With these process steps, the priority of the faces included in an image is set.

Figure 14:
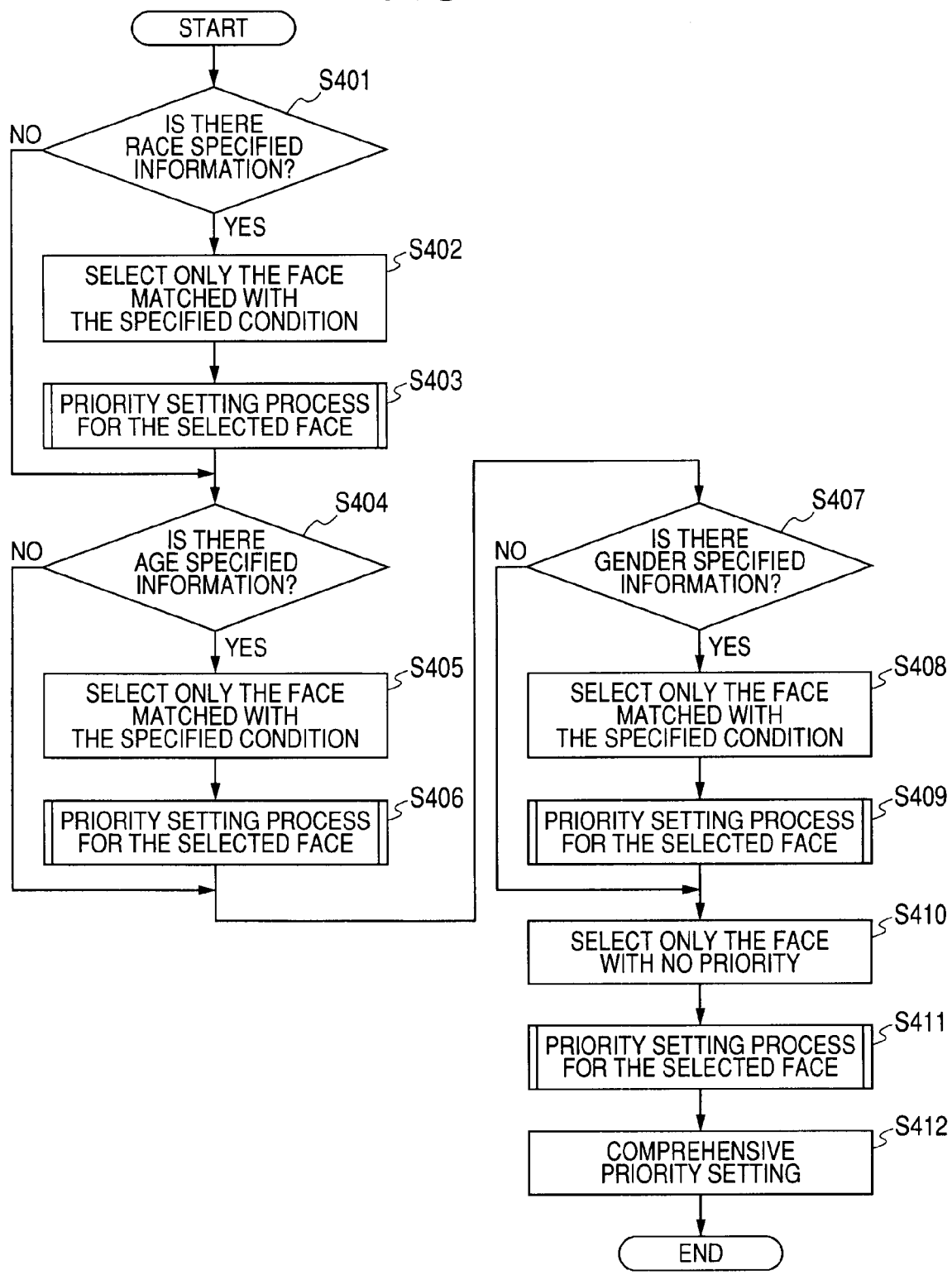
FIG. 14 shows a diagram depicting a flowchart illustrative of an exemplary priority setting process sequence for a subject.

Moreover, the scheme of setting priority is not limited to this scheme, and various schemes may be adapted. For example, the scheme may be performed as the process in accordance with a flow chart shown in FIG. 14. The flow chart shown in FIG. 14 is a method in which only a face matched with each item of race, age, gender specified information is selected to separately prioritize the selected face, and comprehensive priority is finally set based on the individual items of priority information.

The flow chart shown in FIG. 14 will be described. First, at Step S401, it is determined whether there is race specified information as subject specified information. When there is no race specified information, the process goes to Step S404.

When there is race specified information, the process goes to Step S402. Only a face matched with specified information is selected, and the subject priority setting process is performed for the selected face at Step S403. The subject priority setting process is the process described above with reference to the flow chart shown in FIG. 13.

In addition, at Step S404, it is determined whether there is age specified information as subject specified information. When there is no age specified information, the process goes to Step S407. When there is age specified information, the process goes to Step S405. Only a face matched with specified information is selected, and the subject priority setting process is performed for the selected face at Step S406. The subject priority setting process is the process described above with reference to the flow chart shown in FIG. 13.

In addition, at Step S407, it is determined whether there is gender specified information as subject specified information. When there is no gender specified information, the process goes to Step S410. When there is gender specified information, the process goes to Step S408. Only a face matched with specified information is selected, and the subject priority setting process is performed for the selected face at Step S409. The subject priority setting process is the process described above with reference to the flow chart shown in FIG. 13 as well. Subsequently, at Step S410, only a face with no priority is selected, and the process goes to Step S411 to perform the subject priority setting process is performed for the selected face. This process is the process in accordance with the flow chart shown in FIG. 13 as well.

Finally, the process goes to Step S412, and priorities decided at Steps S403, S406, S409, and S411 are combined to perform the comprehensive priority setting process. For this rule of setting priority, various rules may be adapted by user configuration.

Figure 16:
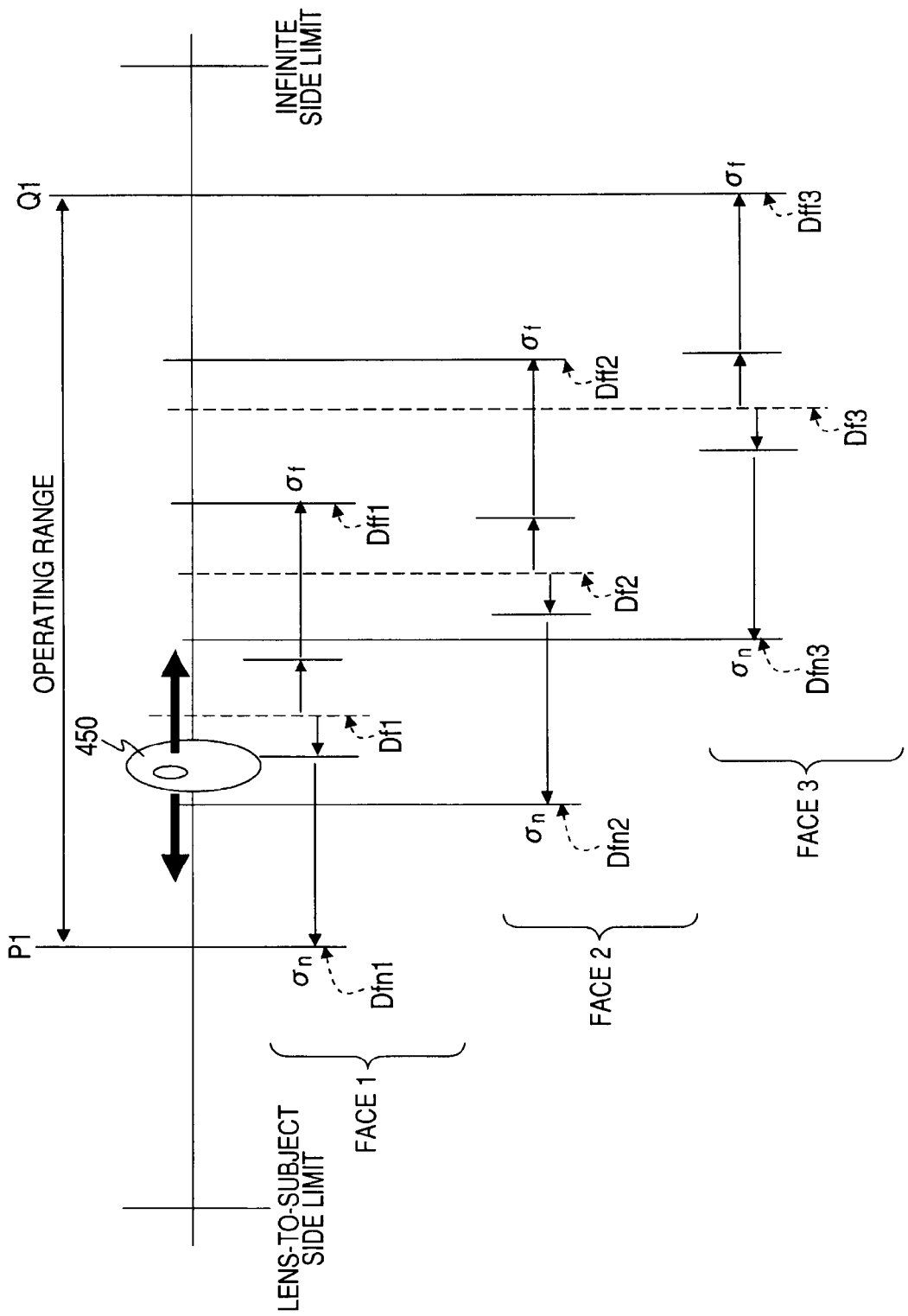
FIG. 16 shows a diagram illustrative of an exemplary focus control process for a subject to which a priority.

The auto focusing process will be described with reference to FIGS. 15 and 16 in the case in which by this priority setting process, priorities are set such that the face with the highest priority is set to Face 1, and the other faces are set to Faces 2, 3, 4, and so on. In auto focusing control in the case in which an image including a plurality of faces is taken, control schemes are different depending on what is important. In other words, A. Importance on quick focusing.

B. Importance on in-focus determination for many faces.

C. Importance on quick focusing into faces as many as possible.

It is rational that a user can select which one, and the following is specific ways for implementation.

A. Importance on Quick Focusing

When importance is placed on quick focusing, the lens operating range (Rf) is set in auto focusing as corresponding to the highest priority Face 1. In other words, the subject distance (Dfn to Dff) for the highest priority Face 1 is computed to set the operating range of the focus lens (Rf). More specifically, as discussed above, the subject distance (Dfn to Dff) for the highest priority Face 1 is applied to set the operating range of the focus lens (Rf) as below.

$$Rf = (Dfn - \alpha n) \text{ to } (Dff + \alpha f)$$

Auto focusing is performed only within this range. Consequently, when it is determined that the other Faces 2, 3 and so on are within a preset allowable focal depth, and then an in-focus mark is put on those faces. The in-focus mark is identifying information showing that it is finished to represent a focus in an image displayed on the monitor or the electronic viewfinder. For example, a frame surrounding Face 1 is displayed as an in-focus frame. A user confirms this in-focus mark to press the release button, whereby reliable shooting is allowed.

FIG. 15 shows exemplary in-focus marks. Examples shown in FIG. 15 are that in-focus marks are put on the image displayed on the monitor of the camera of the imaging apparatus. By the auto focusing process described above, the lens operating range (Rf) is set in accordance with the highest priority Face 1, and the focus lens is driven to decide the point of focus. In this case, naturally, an in-focus frame 431 is set and displayed on Face 1 (421). In addition, at the point of focus, for Face 2 (422), and Face 3 (423), in-focus frames 432 and 433 are displayed on the faces when it is determined that the faces are within a preset allowable focal depth. A user confirms these in-focus marks to press the release button, whereby reliable shooting is allowed.

B. Importance on In-Focus Determination for Many Faces

When importance is placed on in-focus determination for many faces, in order to catch the subject to come into focus, the logical sum of the AF ranges of individual faces is set as a lens operating range (Rf) for the range for auto focusing. In this lens operating range (Rf), the focus position is searched based on contrast determination to put an in-focus mark on a face within the depth of the main subject.

This auto focusing control process will be described with reference to FIG. 16. FIG. 16 shows the operating ranges (Rf) of a focus lens 450, which are computed by applying the subject distances (Dfn to Dff) for Faces 1, 2, and 3. In other words, the operating ranges (Rf) are separately set for Faces 1, 2, and 3:

$Rf=(Dfn-\alpha n)$ to $(Dff+\alpha f)$

When importance is placed on in-focus determination for these Faces 1, 2, and 3, in order to catch the subject to come into focus, the range (the logical sum) of the operating ranges (Rf) determined for Faces 1, 2, and 3, that is, a range between P1 to Q1 in the drawing is set to the lens operating range (Rf) as the range for auto focusing, search for the focus position is performed in the lens operating range (Rf) between P1 and Q1 based on contrast determination, and an in-focus mark is put on a face within the depth of the main subject.

C. Importance on Quick Focusing into Faces as Many as Possible

When importance is placed on quick focusing into faces as many as possible, for each of subject Faces 1, 2, 3 and so on with priority, the subject distance (Dfn to Dff) is applied to compute the AF operating range (the lens operating range (Rf)):

$Rf=(Dfn-\alpha n)$ to $(Dff+\alpha f)$

Subsequently, it is determined whether the AF operating ranges (lens operating ranges (Rf)) set for the subject faces 2, 3, and so on have an area overlapped with the subject distance (Dfn to Df f) of Face 1 that is the most important subject. For Faces 2, 3 and so on having the AF operating ranges (the lens operating range (Rf)) overlapped with the subject distance (Dfn to Dff) of Face 1, the ranges are considered to be the extended area of the AF operating range (the lens operating range (Rf)), and the range to be the sum is set to the AF operating range (lens operating range (Rf)). On the other hand, when there are Faces 4, 5 and so on that do not have any AF operating ranges (lens operating range (Rf)) overlapped with the subject distance (Dfn to Dff) of Face 1, the AF range is not extended for these faces. In addition, when it is determined whether the individual faces are within the depth-of-field of Face 1 and when it is confirmed that they are within the depth-of-field, an in-focus frame is displayed on these faces. Accordingly, such a focus control process is feasible that can make the confirmation of focusing for the face that might not be caught by Method A.

Figure 17:
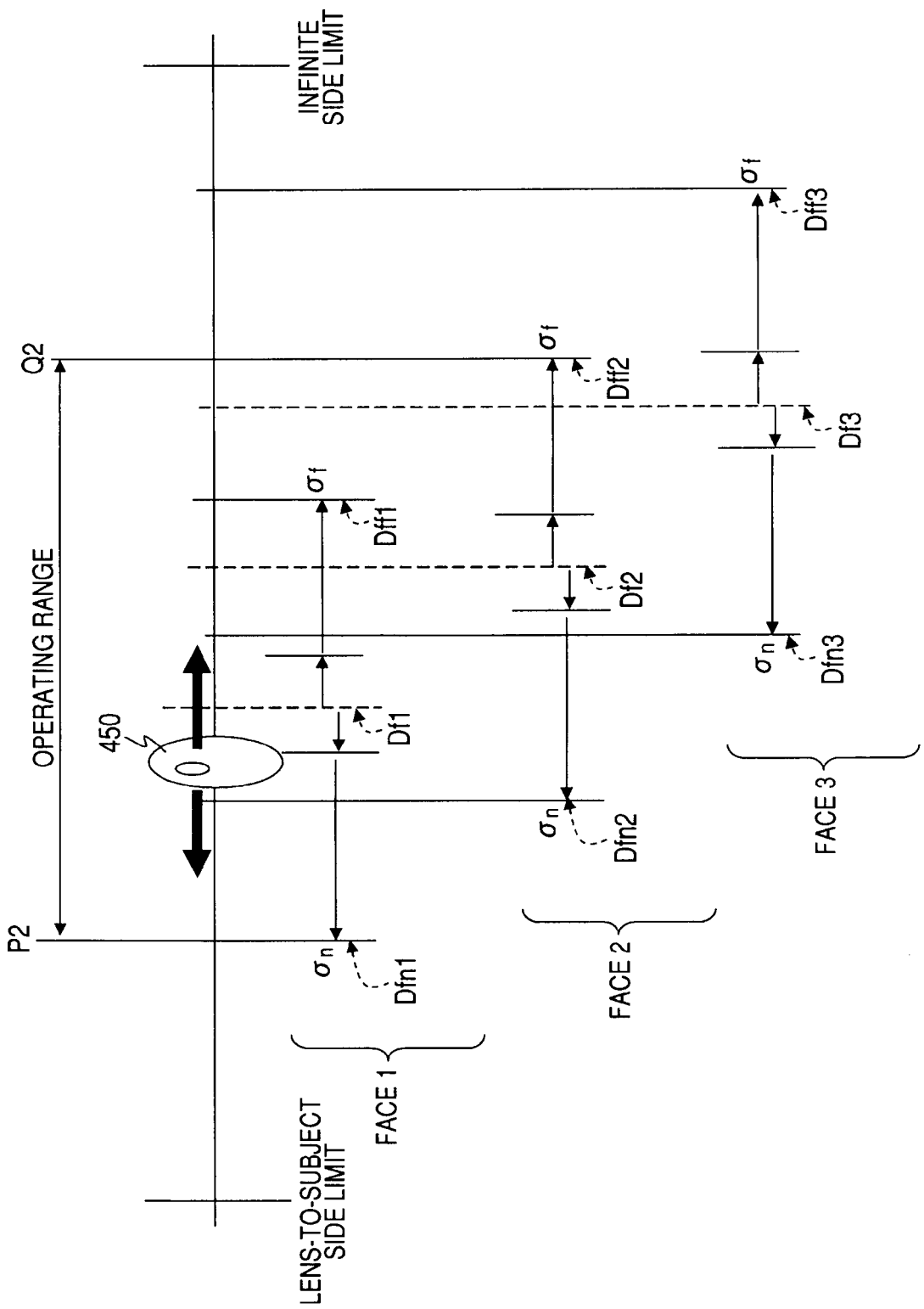
FIG. 17 shows a diagram illustrative of an exemplary focus control process for a subject to which a priority.

This auto focusing control process will be described with reference to FIG. 17. FIG. 17 shows the operating ranges (Rf) of a focus lens 450, which are computed by applying subject distances (Dfn to Dff) for Faces 1, 2, and 3. In other words, the operating ranges (Rf) are separately set for Faces 1, 2, and 3:

$Rf=(Dfn-\alpha n)$ to $(Dff+\alpha f)$

When importance is placed on quick focusing into faces as many as possible, the subject distances (Dfn to Dff) are applied to the subject Faces 1, 2, and 3 with priority to compute the AF operating range (lens operating range (Rf)):

$Rf=(Dfn-\alpha n)$ to $(Dff+\alpha f)$

Subsequently, it is determined whether the AF operating ranges (lens operating ranges (Rf)) set for the subject faces 2, and 3 have an area overlapped with the subject distance (Dfn to Dff) of Face 1 that is the most important subject. The AF operating range (the lens operating range (Rf)) corresponding to Face 2 has the AF operating range (the lens operating range (Rf)) overlapped with the subject distance (Dfn to Dff) of Face 1. Thus, for Face 2, the range is considered to be the extended area of the AF operating range (the lens operating range (Rf)), and the range to be the sum is set to the AF operating range (lens operating range (Rf)).

On the other hand, the AF operating range (the lens operating range (Rf)) corresponding to Face 3 does not have the AF operating range (lens operating range (Rf)) overlapped with the subject distance (Dfn to Dff) of Face 1. Therefore, for Face 3, it is not set to the extended area of the AF operating range (lens operating range (Rf)). In the case of the configuration shown in FIG. 17, the range between P2 to Q2 in the drawing set as the logical sum of the AF operating ranges (lens operating range (Rf)) of Face 1 and Face 2 is set as the lens operating range (Rf) for the range for auto focusing. Search for the focus position is performed in the lens operating range (Rf) between P2 and Q2 based on contrast determination, and an in-focus mark is put on a face within the depth of the main subject. In other words, it is determined whether individual faces are within the depth-of-field of Face 1. When it is confirmed that they are within the depth-of-field, an in-focus frame is displayed as well on these faces.

The auto focusing control process described above is performed to put an in-focus mark on a face within the depth-of-field with respect to the most important face, and a picture easily used by a user can be obtained. This is especially effective such a scene that has a plurality of subjects desired to come into focus, such as a picture of friends gathering, and a picture of mother and baby. Moreover, when it is desired to bring faces into focus as many as possible rather than the speed of auto focusing, such a scheme may be done in which a single depth is added to the AF operating range in conversion of the focal depth and an in-focus frame is put on all the faces within the range.

Figure 18:
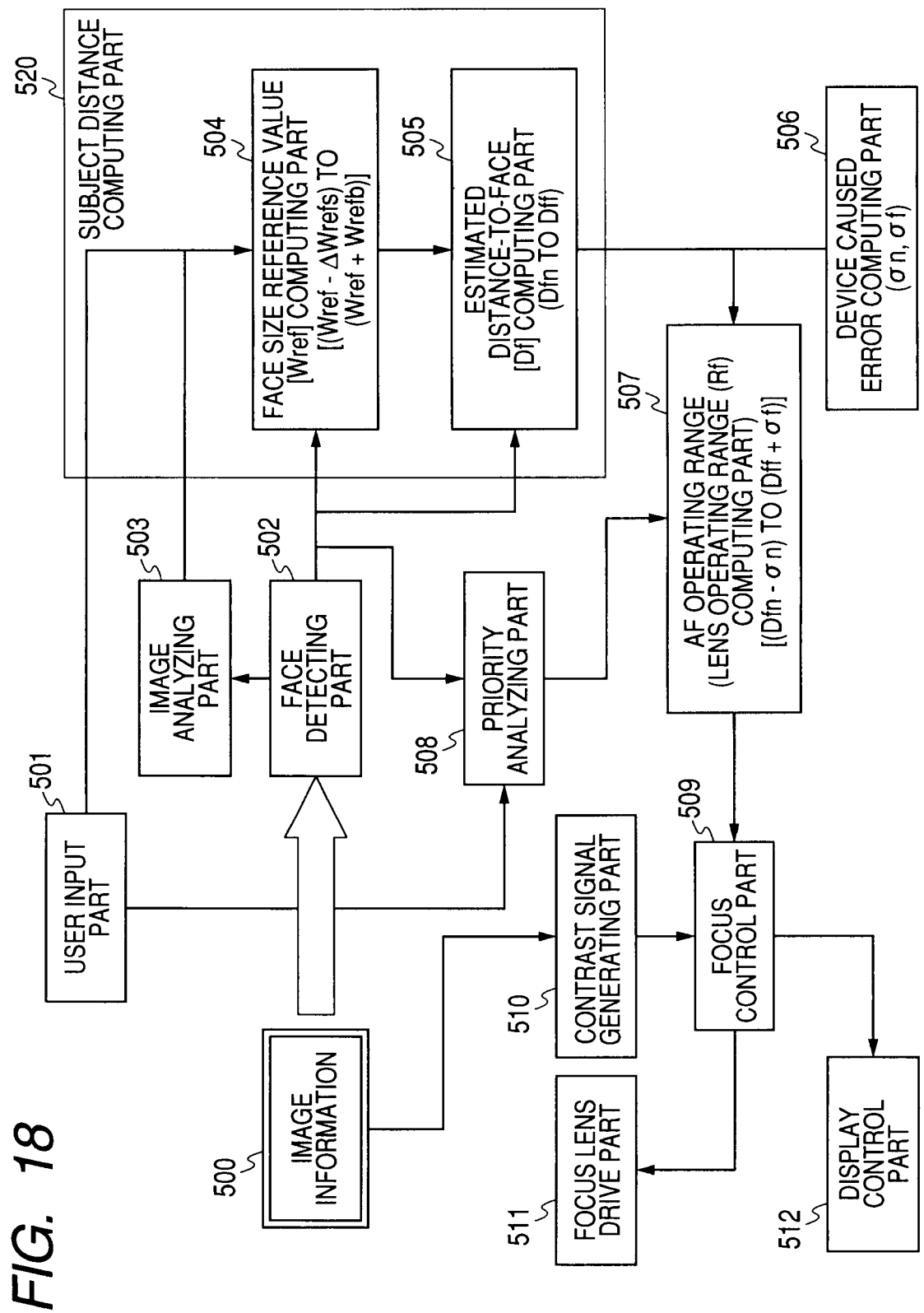
FIG. 18 shows a block diagram illustrative of processes and functions of the imaging apparatus according to an embodiment of the invention.

Lastly, the functional configuration to perform the processes done in the imaging apparatus according to an embodiment of the invention will be described with reference to FIG. 18. The processes described above are executed in accordance with the program run under control mainly done by the control part 110 by applying the hardware configuration described with reference to FIG. 2 above. FIG. 18 shows a block diagram for illustration as the functions applied to perform the processes are centered.

Image information 500 captured in the imaging apparatus is inputted to a face detecting part 502 through the imaging device, the digital signal processing part and so on described with reference to FIG. 2. For example, as described above, in the face detecting part 502, the matching process of the real image with the template having face brightness distribution information recorded is performed to determine and detect a face area from the image information 500.

Image information including face detection information detected by the face detecting part 502 is outputted to an image analyzing part 503, a face size reference value [Wref] computing part 504 and an estimated distance-to-face [Df] computing part 505 of a subject distance computing part 520, and a priority analyzing part 508. The image analyzing part 503 performs the image analysis process described with reference to FIG. 7 above. In other words, the image analyzing part 503 analyzes a face image included in the image taken by the imaging apparatus to estimate the race, gender, age, and body conformation of a person of the face. In other words, the parts of a face are distinguished, matching is performed for the parts information corresponding to race, gender, age, and body conformation registered in advance, the race, gender, age, and body conformation of the subject are estimated, and the estimated information is inputted to the face size reference value [Wref] computing part 504. Moreover, it may be configured in which a user inputs subject information through the user input part 501.

The face size reference value [Wref] computing part 504 of the subject distance computing part 520 computes the optimum reference value (Wref) in accordance with the subject by applying each table based on the subject information inputted through the image analyzing part 503 or the user input part 501. For the computation process, as described with reference to FIGS. 7 to 10 above, a table is referenced to compute the range of the reference value Wref=(Wref+ΔWrefb) to (Wref−ΔWrerfs) in consideration of variations to some extent. In other words, the result is outputted in consideration that a shift on the greater side assumed is ΔWrefb, and a shift on the smaller side assumed is ΔWrefs.

In the estimated distance-to-face [Df] computing part 505 of the subject distance computing part 520, the range from Dfn to Dff of the subject distance is computed in consideration of error that occurs in the face template matching process, that is, error based on error detecting performance, intensity, the inclination of the face, etc. The basic equation of computing the subject distance is the equation described above, that is, it is shown below.

$$Df = Wref \times (f/Wi) \times (Ww/Wf) \quad \text{(Equation 1.1)}$$

The following is the description of signs in the equation above.

Human face size reference value: Wref
Width of the imaging device: Wi
Focal length: f
The number of pixels of the human face size in the taken image (the value detected by the imaging device): Wf
The number of pixels of the size of the image for use in human face detection (the value detected by the imaging device): Ww In the equation, the following is computed in template matching:
Face size: Ws, when it is determined smallest, and
Face size: Wb, when it is determined greatest.

The equation (Equation 1.1) is applied to compute the range from Dfn to Dff of the subject distance in consideration of the face size reference value:

$$Wref = (Wref + \Delta Wrefb) \text{ to } (Wref - \Delta Wrerfs).$$

In other words, the following is set:

$$Wref = Wref - \Delta Wrefb,$$

$$Wf = Ws$$

Equation Df=Wref ((f/Wi)) ((Ww/Wf)) is computed to yield the result (Dff) when error is extended furthermost. In addition, the following is set:

$$Wref = Wref - \Delta Wrefs,$$

$$Wf = Wb$$

Equation Df=Wref ((f/Wi)) ((Ww/Wf)) is computed to yield the result (Dfn) when error is extended nearest. Then, the range from Dfn to Dff of the subject distance is computed.

The items of information about the subject distance Dfn to Dff are inputted to an AF operating range (lens operating range (Rf)) computing part 507. The AF operating range (lens operating range (Rf)) computing part 507 sets the operating range of the focus lens (Rf) including the error range computed by a device caused error computing part 506 with respect to the subject distance (Dfn to Dff). The device caused error computing part 506 computes the error range in consideration of non-linear focus movement in the focal length direction, the movement of the focus position of the device caused by the device temperature characteristics, and hysteresis among various devices. This error is set such that □n is on the lens-to-subject side, and □f is on the infinite side.

The AF operating range (the lens operating range (Rf) computing part) 507 adds error σn on the lens-to-subject side, and error σf on the infinite side, and sets the operating range of the focus lens (Rf) as below:

$$Rf = (Dfn - \sigma n) \text{ to } (Dff + \sigma f)$$

Information for the operating range of the focus lens (Rf) is inputted to a focus control part 509 to output a drive command for a focus lens drive part 511. The focus lens is moved in the operating range of the focus lens (Rf), an AF evaluation value is computed from contrast information generated from a contrast signal generating part 510 at every point moved to perform a process to determine the focus position at a position with a higher AF evaluation value. A display control part 512 performs the process for the subject brought into focus by focus control so as to display the in-focus frame thereon as described with reference to FIG. 15.

In addition, when a plurality of faces is included in image information 500, the priority analyzing part 508 determines the priority of the faces. As discussed above, as the priority setting process, such a process is performed in which indicators are the size of a face and how the face is close to the center. Furthermore, a priority is set based on specified information inputted through the user input part 501, such as race, age, gender, and body conformation specified information. This process is the process described with reference to FIGS. 12 to 14 above.

The priority information decided in the priority analyzing part 508 is inputted to the AF operating range (the lens operating range (Rf)) computing part 507. In this case, the AF operating range (the lens operating range (Rf)) computing part 507 computes the AF operating range (the lens operating range (Rf) based on the priority information. More specifically, as discussed above, different processes are performed depending on the cases below:

A. Importance on quick focusing,
B. Importance on in-focus determination for many faces (FIG. 16), and C. Importance on quick focusing into faces as many as possible.

Through these processes, the operating range of the focus lens (Rf) is decided, the decided information is inputted to the focus control part 509, a drive command is outputted to the focus lens drive part 511, and then the focus position is set in the operating range of the focus lens (Rf) based on contrast. The display control part 512 performs the process for the subject to be brought into focus by focus control so as to display the in-focus frame thereon as described with reference to FIG. 15.

As described above, an embodiment of the invention has been described in detail with reference to specific implementations. However, it should be apparent that those skilled in the art could make modifications and substitutions of the embodiment within the scope of the teachings according to an embodiment of the invention. In other words, an embodiment of the invention has been disclosed in the exemplary forms, which should not be interpreted in limited ways. To understand the teachings of an embodiment of the invention, the appended claims should be considered.

Furthermore, a series of the process steps described in the specification can be implemented by hardware, or software, or configurations combining both. When the process steps are implemented by software, a program having a process sequence recorded is installed in a memory inside a computer incorporated in dedicated hardware for implementation, or the program is installed in a multi-purpose computer feasible to run various process steps for implementation.

For example, the program can be recorded in advance on a hard dick or ROM (Read Only Memory) as a recording medium. Alternatively, the program can be stored (recorded) temporarily or permanently on a removable recording medium such as a flexible disk, a CD-ROM (Compact Disc Read Only Memory), a MO (Magneto optical) disk, a DVD (Digital Versatile Disc), a magnetic disk, a semiconductor memory, etc. Such a removable recording medium can be provided as so-called package software.

Moreover, in addition to installing the program in a computer through a removable recording medium as described above, the program can be installed in such a way that the program is transferred to a computer through a download site in radio, or to a computer via a network such as a LAN (Local Area Network), and the Internet in a wired manner, and then the computer receives the program thus transferred to install it in a recording medium such as a hard dick incorporated therein.

Moreover, various process steps described in the specification may be done in time series in accordance with the description as well as done in a parallel manner or separately depending on the processing performance of an apparatus to execute the process steps or as necessary. Furthermore, the system in the specification is a configuration of a logical assembly of a plurality of units, which is not limited to such a form that units in individual configurations are in the same housing.

As discussed above, in the configuration according to an embodiment of the invention, in the auto focusing process in the imaging apparatus, a face area is detected from an input image, a subject distance is computed based on the size of the detected face, and a focus position is estimated based on computed information about the subject distance. In addition, based on the estimated focus position, a focus lens operating range is set that is shorter than the entire operating range of a focus lens, and the focus lens is moved within the set lens operating range to decide the position at which the focus lens is set. According to the configuration, the distance of the lens to be moved in focus control can be set, and accelerated focus control can be implemented.

In addition, in accordance with the configuration according to an embodiment of the invention, in the subject distance computing process, it is configured in which at least any one of the items of subject information for race, gender, age, and body conformation is inputted, and the subject distance computing process is performed to which the reference value of the size of a face is applied in accordance with the subject based on the inputted subject information. Therefore, a more accurate subject distance adaptive to the subject can be computed, and accurate focus control can be implemented.

In addition, in accordance with the configuration according to an embodiment of the invention, it is configured in which in the priority analyzing part, the priority of a plurality of faces detected in the face detecting part is decided using indicators such as the size of a face, how the face is close to the center, or subject information for race, gender, age, and body conformation, a process is performed to set the focus lens operating range based on the decided priority of the face information. Even though a plurality of faces is detected, focus control can be performed over the face with higher priority.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   a face detecting part configured to detect a face area from an input image inputted from the imaging apparatus;
   a subject distance computing part configured to compute a distance range including a nearest estimated subject distance and a farthest estimated subject distance, the distance range computed using a size of a face detected in the face detecting part and one or more variables compensating for errors associated with estimating the size of the face in a face template matching process;
   a lens operating range computing part configured to, using the distance range computed by the subject distance computing part, estimate a focus position and to set a focus lens operating range shorter than an entire operating range of a focus lens; and
   a focus control part configured to move the focus lens within the lens operating range set in the lens operating range computing part, and to decide a position at which the focus lens is set.

2. The imaging apparatus according to claim 1, wherein the subject distance computing part is configured to perform a subject distance computing process in which at least any one of items of subject information for race, gender, age, and body conformation is inputted, and a reference value of the size of a face in accordance with a subject is applied based on the inputted subject information in the subject distance computing process based on the size of a face detected in the face detecting part.

3. The imaging apparatus according to claim 2, wherein at least any one of items of the subject information for race, gender, age, and body conformation information is information that is inputted to the subject distance computing part as an analyzed result from an image analyzing part, the result being derived from an input image inputted in the imaging apparatus.

4. The imaging apparatus according to claim 2, wherein at least any one of items of the subject information for race, gender, age, and body conformation is information that is inputted to the subject distance computing part through a user input part of the imaging apparatus.

5. The imaging apparatus according to claim 1, wherein the subject distance computing part is configured to perform a subject distance computing process to which a reference value of the size of a face in accordance with a subject is applied, and is configured to perform a process in which a reference value of the size of a face is computed as a reference value with a range of certain values, not a single value, and the reference value with the range is applied to compute the distance range.

6. The imaging apparatus according to claim 1, wherein
the one or more variables depend on one or more templates indicating variation of face sizes based on one or more face characteristics, the one or more variables including a variable indicating a maximum estimated face size from the one or more templates, and a variable indicating a minimum estimated face size from the one or more templates, and
the subject distance computing part is further configured to compute the nearest estimated subject distance using the maximum estimated face size, and compute the furthest estimated subject distance using the minimum estimated face size.

7. The imaging apparatus according to claim 1, wherein the lens operating range computing part is configured to using one or more variables that compensate for errors in the computed distance range associated with at least non-linear movement of the focus lens.

8. The imaging apparatus according to claim 1, wherein the imaging apparatus further comprises a priority analyzing part configured to set a priority of a plurality of faces detected in the face detecting part,
wherein the priority analyzing part is configured to perform a face priority decision process using the size of a face, or how a face is close to the center, or at least any one of items of subject information for race, gender, age, and body conformation, as an indicator, and
the lens operating range computing part is configured to perform a process in which a focus lens operating range is set based on face priority information decided in the priority analyzing part.

9. The imaging apparatus according to claim 8, wherein the lens operating range computing part is configured to perform a process in which a focus lens operating range is set based on information about the subject distance corresponding to a face with the highest priority decided in the priority analyzing part.

10. The imaging apparatus according to claim 8, wherein
the lens operating range computing part is further configured to perform a process in which a range including a plurality of focus lens operating ranges computed based on information about the subject distance corresponding to a plurality of faces in priority order decided in the priority analyzing part is set as a final focus lens operating range.

11. The imaging apparatus according to claim 1, wherein the imaging apparatus further comprises a display control part configured to put an in-focus mark on a face area in a monitor output image, the in-focus mark showing that focusing is successful, and the monitor output image being determined that focusing is successful based on the decision for a position at which the focus lens is set in the focus control part.

12. A control method of an imaging apparatus which performs auto focusing control in the imaging apparatus, the method comprising:

detecting a face area in a face detecting part from an input image inputted from the imaging apparatus;
computing, in a subject distance computing part, a distance range including a nearest estimated subject distance and a farthest estimated subject distance, the distance range estimated using a size of a face detected in the face detecting part and one or more variables compensating for errors associated with estimating the size of the face in a face template matching process;
estimating, using the distance range computed by the subject distance computing part, a focus position in a lens operating range setting, using the distance range computed by the subject distance computing part, a focus lens operating range shorter than an entire operating range of a focus lens; and
moving a focus lens in a focus control part within the lens operating range set in the lens operating range computing part, and deciding a position at which the focus lens is set.

13. The control method according to claim 12, wherein the step of computing the distance range further includes performing a subject distance computing process in which at least any one of items of subject information for race, gender, age, and body conformation is inputted, and a reference value of the size of a face in accordance with a subject is applied based on the inputted subject information in the subject distance computing process based on the size of a face detected in the face detecting part.

14. The control method according to claim 13, wherein at least any one of items of the subject information for race, gender, age, and body conformation is information that is inputted to the subject distance computing part as an analyzed result from an image analyzing part, the result being derived from an input image inputted in the imaging apparatus.

15. The control method according to claim 13, wherein at least any one of items of the subject information for race, gender, age, and body conformation is information that is inputted to the subject distance computing part through a user input part of the imaging apparatus.

16. The control method according to claim 12, wherein the step of computing the distance range further includes performing a subject distance computing process to which a reference value of the size of a face in accordance with a subject is applied, and performing a process in which a reference value of the size of a face is computed as a reference value with a range of certain values, not a single value, and the reference value with the range is applied to compute a subject distance with a range.

17. The control method according to claim 12, wherein
the one or more variables depend on one or more templates indicating variation of face sizes based on one or more face characteristics, the one or more variables including a variable indicating a maximum estimated face size from the one or more templates, and a variable indicating a minimum estimated face size from the one or more templates, and
computing the distance range further includes:
computing the nearest estimated subject distance using the maximum estimated face size, and
computing the furthest estimated subject distance using the minimum estimated face size.

18. The control method of an imaging apparatus according to claim 12, wherein the step of computing a setting the lens operating range is the step of performing a process in which a focus lens operating range is set based on information about the subject distance computed in the subject distance computing part in consideration of error caused by a device in the imaging apparatus further includes using one or more variables that compensate for errors in the computed distance range associated with at least non-linear movement of the focus lens.

19. The control method according to claim 12, further comprising:
analyzing priority in a priority analyzing part configured to set a priority of a plurality of faces detected in the face detecting part; and
performing a face priority decision process using the size of a face, or how a face is close to the center, or at least any one of items of subject information for race, gender, age, and body conformation, as an indicator, wherein
the computing the lens operating range further includes performing a process in which a focus lens operating range is set based on face priority information decided in the priority analyzing part.

20. The control method according to claim 19, wherein the computing the lens operating range further includes performing a process in which the focus lens operating range is set based on information about the distance range corresponding to a face with the highest priority decided in the priority analyzing part.

21. The control method of an imaging apparatus according to claim 19, wherein the step of computing a lens operating range further comprises:
performing a process in which a range including a plurality of focus lens operating ranges computed based on information about the subject distance corresponding to a plurality of faces in priority order decided in the priority analyzing part is set as a final focus lens operating range.

22. The control method according to claim 12, further comprising:
controlling display in a display control part, in which an in-focus mark is put on a face area in a monitor output image, the in-focus mark showing that focusing is successful, and the monitor output image being determined that focusing is successful based on the decision for a position at which the focus lens is set in the focus control part.

23. A non-transitory computer readable medium having stored thereon computer executable instructions that when executed by a processor in an imaging apparatus cause the imaging apparatus to execute a method for auto focusing control, the method comprising:
detecting a face area in a face detecting part from an input image inputted from the imaging apparatus;
computing, in a subject distance computing part, a distance range including a nearest estimated subject distance and a farthest estimated subject distance, the distance range estimated using a size of a face detected in the face detecting part and one or more variables compensating for errors associated with estimating the size of the face in a face template matching process;
estimating, using the distance range computed by the subject distance computing part, a focus position in a lens operating range setting, using the distance range computed by the subject distance computing part, a focus lens operating range shorter than an entire operating range of a focus lens; and
moving a focus lens in a focus control part within the lens operating range set in the lens operating range computing part, and deciding a position at which the focus lens is set.

24. An imaging apparatus comprising:
a face detecting part configured to detect a face area from an input image inputted from the imaging apparatus;
a subject distance computing part configured to compute a subject distance based on the size of a face detected in the face detecting part;
a lens operating range computing part configured to estimate a focus position based on information about the subject distance computed in the subject distance computing part, and to set a focus lens operating range shorter than an entire operating range of a focus lens;
a focus control part configured to move the focus lens within the lens operating range set in the lens operating range computing part, and to decide a position at which the focus lens is set; and
a priority analyzing part configured to set a priority of a plurality of faces detected in the face detecting part,
wherein the priority analyzing part is further configured to perform a face priority decision process using the size of a face, or how a face is close to the center, or at least any one of items of subject information for race, gender, age, and body conformation, as an indicator,
the lens operating range computing part is further configured to perform a process in which a focus lens operating range is set based on face priority information decided in the priority analyzing part, and
the lens operating range computing part is configured to perform a process in which a range including a plurality of focus lens operating ranges computed based on information about the subject distance corresponding to a plurality of faces in priority order decided in the priority analyzing part is set as a final focus lens operating range.

25. A control method of an imaging apparatus which performs auto focusing control in the imaging apparatus, the method comprising:
detecting a face area in a face detecting part from an input image inputted from the imaging apparatus;
computing a subject distance in a subject distance computing part based on the size of a face detected in the face detecting part;
estimating a focus position in a lens operating range computing part based on information about the subject distance computed in the subject distance computing part, and setting a focus lens operating range shorter than an entire operating range of a focus lens;
moving a focus lens in a focus control part within the lens operating range set in the lens operating range computing part, and deciding a position at which the focus lens is set;
analyzing priority in a priority analyzing part configured to set a priority of a plurality of faces detected in the face detecting part; and
performing a face priority decision process using the size of a face, or how a face is close to the center, or at least any one of items of subject information for race, gender, age, and body conformation, as an indicator, wherein
the step of computing a lens operating range further comprises performing a process in which a focus lens operating range is set based on face priority information decided in the priority analyzing part, and
the step of computing a lens operating range further comprises performing a process in which a range including a plurality of focus lens operating ranges computed based on information about the subject distance corresponding to a plurality of faces in priority order decided in the priority analyzing part is set as a final focus lens operating range.

* * * * *